US012719932B2

(12) United States Patent
Crabtree et al.

(10) Patent No.: US 12,719,932 B2
(45) **Date of Patent: *Aug. 25, 2026**

(54) SELF-ADJUSTING CYBERSECURITY ANALYSIS WITH NETWORK MAPPING

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/653,973

(22) Filed: May 3, 2024

(65) Prior Publication Data

US 2024/0291869 A1 Aug. 29, 2024

Related U.S. Application Data

(63) Continuation-in-part of application No. 18/299,677, filed on Apr. 12, 2023, now Pat. No. 11,991,215, (Continued)

(51) Int. Cl.

*H04L 9/40* (2022.01)
*G06F 16/2458* (2019.01)
*G06F 16/951* (2019.01)

(52) U.S. Cl.

CPC .......... *H04L 63/20* (2013.01); *G06F 16/2477* (2019.01); *G06F 16/951* (2019.01); (Continued)

(58) Field of Classification Search

CPC . H04L 63/20; H04L 63/1425; H04L 63/1433; H04L 63/1441; G06F 16/2477; G06F 16/951

See application file for complete search history.

(56) References Cited

U.S. PATENT DOCUMENTS 6,256,544 B1 7/2001 Weissinger
7,266,821 B2 9/2007 Polizzi et al.
(Continued)

FOREIGN PATENT DOCUMENTS

WO 2014159150 A1 10/2014
WO 2017075543 A1 5/2017

*Primary Examiner* — Cheng-Feng Huang
(74) *Attorney, Agent, or Firm* — NK Patent Law

(57) ABSTRACT

A system and method for self-adjusting cybersecurity analysis with network mapping, wherein a reconnaissance engine gathers data about a client's computer network from the client, from devices and systems on the client's network, and from the Internet regarding various aspects of cybersecurity. Each of these aspects is evaluated independently, weighted, and cross-referenced to generate a cybersecurity score by aggregating individual vulnerability and risk factors together to provide a comprehensive characterization of cybersecurity risk using a transparent and traceable methodology. The scoring system itself can be used as a state machine with the cybersecurity score acting as a feedback mechanism, in which a cybersecurity score can be set at a level appropriate for a given organization, and data from clients or groups of clients with more extensive reporting can be used to supplement data for clients or groups of clients with less extensive reporting to enhance cybersecurity analysis and scoring.

28 Claims, 21 Drawing Sheets

Related U.S. Application Data which is a continuation of application No. 17/219,833, filed on Mar. 31, 2021, now Pat. No. 11,700,283, which is a continuation of application No. 16/837,551, filed on Apr. 1, 2020, now Pat. No. 11,070,592, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, said application No. 16/837,551 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(52) U.S. Cl.
CPC ...... *H04L 63/1425* (2013.01); *H04L 63/1433* (2013.01); *H04L 63/1441* (2013.01)

(56) References Cited

U.S. PATENT DOCUMENTS

| | | | | |
|---|---|---|---|---|
| 7,373,524 | B2 | 5/2008 | Motsinger et al. | |
| 7,406,715 | B2 | 7/2008 | Clapper | |
| 7,530,105 | B2 | 5/2009 | Gilbert et al. | |
| 7,818,417 | B2 | 10/2010 | Ginis et al. | |
| 8,281,121 | B2 | 10/2012 | Nath et al. | |
| 8,485,085 | B2 | 7/2013 | Goree et al. | |
| 8,566,945 | B2 | 10/2013 | Sima | |
| 8,615,800 | B2 | 12/2013 | Baddour et al. | |
| 8,677,473 | B2 | 3/2014 | Dennerline et al. | |
| 8,793,758 | B2 | 7/2014 | Raleigh et al. | |
| 8,914,878 | B2 | 12/2014 | Burns et al. | |
| 9,092,616 | B2 | 7/2015 | Kumar et al. | |
| 9,256,735 | B2 | 2/2016 | Stute | |
| 9,319,430 | B2 | 4/2016 | Bell, Jr. et al. | |
| 9,349,014 | B1 * | 5/2016 | Hubing | G06F 21/316 |
| 9,491,178 | B2 | 11/2016 | Bubany et al. | |
| 9,495,188 | B1 | 11/2016 | Ettema et al. | |
| 9,501,647 | B2 | 11/2016 | Yampolskiy et al. | |
| 9,509,716 | B2 | 11/2016 | Shabtai et al. | |
| 9,560,065 | B2 * | 1/2017 | Neil | H04L 63/1425 |
| 9,602,530 | B2 * | 3/2017 | Ellis | H04L 63/20 |
| 9,654,495 | B2 * | 5/2017 | Hubbard | H04L 63/145 |
| 9,672,355 | B2 | 6/2017 | Titonis et al. | |
| 9,749,343 | B2 | 8/2017 | Watters et al. | |
| 9,749,344 | B2 | 8/2017 | Watters et al. | |
| 9,762,443 | B2 | 9/2017 | Dickey | |
| 9,774,616 | B2 * | 9/2017 | Flores | H04L 63/1433 |
| 9,860,208 | B1 * | 1/2018 | Ettema | H04L 63/0227 |
| 9,882,929 | B1 * | 1/2018 | Ettema | G06F 21/53 |
| 9,887,933 | B2 | 2/2018 | Lawrence, III | |
| 9,923,911 | B2 | 3/2018 | Vasseur et al. | |
| 10,044,675 | B1 | 8/2018 | Ettema et al. | |
| 10,061,635 | B2 | 8/2018 | Ellwein | |
| 10,230,757 | B2 | 3/2019 | Bobritsky | |
| 10,248,910 | B2 | 4/2019 | Crabtree et al. | |
| 10,320,828 | B1 | 6/2019 | Derbeko et al. | |
| 10,367,829 | B2 | 7/2019 | Huang et al. | |
| 2004/0186989 | A1 * | 9/2004 | Clapper | G06F 21/6281 713/151 |
| 2004/0255167 | A1 | 12/2004 | Knight | |
| 2005/0198099 | A1 | 9/2005 | Motsinger et al. | |
| 2013/0304623 | A1 | 11/2013 | Kumar et al. | |
| 2016/0099960 | A1 | 4/2016 | Gerritz et al. | |
| 2016/0140519 | A1 | 5/2016 | Trepca et al. | |
| 2016/0173521 | A1 * | 6/2016 | Yampolskiy | G06Q 10/06393 726/25 |
| 2016/0241561 | A1 * | 8/2016 | Bubany | H04L 63/1433 |
| 2016/0275123 | A1 | 9/2016 | Lin et al. | |
| 2017/0017640 | A1 * | 1/2017 | Bellamy | H04L 12/1822 |
| 2017/0104775 | A1 * | 4/2017 | Vasseur | H04L 63/1425 |
| 2022/0060508 | A1 | 2/2022 | Crabtree et al. | |

* cited by examiner

SOCIAL NETWORKS & OPEN SOURCE INTELLIGENCE FEEDS

901 LinkedIn Scraping

902 Twitter, Instagram, Facebook sentiment analysis

903 Job description analysis/parsing

904 Search domains on pastebin & open-source feeds

905 Search for leaked credentials on pastebin

SELF-ADJUSTING CYBERSECURITY ANALYSIS WITH NETWORK MAPPING

CROSS-REFERENCE TO RELATED APPLICATIONS

Priority is claimed in the application data sheet to the following patents or patent applications, each of which is expressly incorporated herein by reference in its entirety:

Ser. No. 18/299,677
Ser. No. 17/219,833
Ser. No. 16/837,551
Ser. No. 16/777,270
Ser. No. 16/720,383
Ser. No. 15/823,363
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 15/818,733

BACKGROUND OF THE INVENTION

Field of the Art

The disclosure relates to the field of cybersecurity, and more particularly to the fields of cyber insurance and data collection.

Discussion of the State of the Art

In the previous twenty years since the widespread advent of the internet and growth of internet-capable assets, multiple corporations, interest groups, and government agencies have come to take advantage of this connectivity for increased functionality and abilities. At the same time, the complexity and frequency of attacks on such assets and against such groups has increased, resulting numerous times in data loss, data corruption, compromised assets, data theft, loss of funds or resources, and in some cases increased intelligence by a rival group, including foreign governments and their agencies. It is currently possible to examine the state of a corporation or other group's network and determine basic security needs, inadequacies and goals, with various tools in the field today. This and similar efforts in cybersecurity are important not just for protecting assets, but for purposes such as determining the likelihood of data loss, potential asset compromises, determining the need for increased security, and the potential cost of insurance in the event of a cybersecurity incident. There are limitations to such efforts to acquire information about groups' network capabilities and vulnerabilities however, in both the data recorded and the method the data is recorded. Time-graphs and machine learning are not employed along with comprehensive, holistic reconnaissance efforts to establish full security profiles for clients. Data from many sources is not gathered properly due to the heterogeneous nature of the data, with sources of useful data differing in data content, format, the timespan in which new data is recorded or emitted, and scale and quantity of available data.

What is needed is a system or systems capable of generating a comprehensive cybersecurity score for a computer network based on a variety of heterogenous data, and making recommendations for adjusting the computer network's cybersecurity to match a level of security that appropriately balances the costs and benefits of increased or decreased cybersecurity.

SUMMARY OF THE INVENTION

Accordingly, the inventor has conceived and reduced to practice a system and method for self-adjusting cybersecurity analysis with network mapping. The system and method comprise a scoring system in which a reconnaissance engine gathers data about a client's computer network from the client, from devices and systems on the client's network, and from the Internet regarding various aspects of cybersecurity. Each of these aspects is evaluated independently, weighted, and a cybersecurity score is generated by aggregating individual vulnerability and risk factors together to provide a comprehensive characterization of cybersecurity risk using a transparent and traceable methodology. Each component is then further evaluated across, or relative to, the various aspects to further evaluate, validate, and adjust the cybersecurity score. The scoring system itself can be used as a state machine with the cybersecurity score acting as a feedback mechanism, in which a cybersecurity score can be set at a level appropriate for a given organization, allowing for a balance between the costs of increasing security versus the risks of loss associated with lesser security. Data from clients or groups of clients with more extensive reporting can be extracted, generalized, and applied to clients or groups of clients with less extensive reporting to enhance cybersecurity analysis and scoring where data are sub-optimal.

According to a preferred embodiment, a system for self-adjusting cybersecurity analysis and rating based on heterogeneous data and reconnaissance is disclosed, comprising: a computing device comprising a memory, a processor, and a network interface; a high volume web crawler comprising a first plurality of programming instructions stored in the memory of, and operating on the processor of, the computing device, wherein the first plurality of programming instructions, when operating on the processor, cause the computing device to obtain information from the Internet as directed by an automated planning service module; an automated planning service module, comprising a second plurality of programming instructions stored in the memory of, and operating on the processor of, the computing device, wherein the second plurality of programming instructions, when operating on the processor, cause the computing device to periodically or continuously establish a score for one or more of the following aspects of cybersecurity analysis by: defining a target network by identifying internet protocol addresses, domains, or subdomains of the target network, verifying domain name system information for each internet protocol address and subdomain of the target network, and assigning an Internet reconnaissance score; collecting domain name system information by identifying improper network configurations in the internet protocol addresses and subdomains of the target network, and assigning a domain name system information score; identifying web applications used by the target network, analyzing web applications used by the target network to identify vulnerabilities in the web applications that could allow unauthorized access to the target network, and assigning a web application security score; identifying personnel within the target network, searching social media networks for information of concern related to the personnel identified within the target network, and assigning a social network score; conducting a scan of the target network for open TCP/UDP ports, and assigning an open port score, identifying leaked credentials associated with the target network that are found to be disclosed in previous breach incidents, and assigning a credential score; gathering version and update information for hardware and software systems within the boundary of the target network, checking version and update information for the hardware and software systems within the boundary of the target network, and assigning a patching frequency score; and identifying content of interest contained within the target network, performing an Internet search to identify references to the content of interest, and assigning an open-source intelligence score; and a cybersecurity scoring engine comprising a third plurality of programming instructions stored in the memory of, and operating on the processor of, the computing device, wherein the third plurality of programming instructions, when operating on the processor, cause the computing device to create a weighted cybersecurity score by: assigning a weight to each of the Internet reconnaissance score, the domain name system leak information score, the web application security score, the social network score, the open port score, service vulnerability score, the credential score, the patching frequency score, and the open-source intelligence score; combining the weighted scores into the weighted cybersecurity score; and a feedback engine comprising a fourth plurality of programming instructions stored in the memory of, and operating on the processor of, the computing device, wherein the fourth plurality of programming instructions, when operating on the processor, cause the computing device to: compare the weighted cybersecurity score to a score set point; recommend changes to network security to either increase or decrease network security to bring the score into equilibrium with the score set point.

According to another preferred embodiment, a method for self-adjusting cybersecurity analysis and rating based on heterogeneous data and reconnaissance is disclosed, comprising the steps of: establishing a score for one or more of the following aspects of cybersecurity analysis by: defining a target network by identifying internet protocol addresses and subdomains of the target network, verifying domain name system information for each internet protocol address and subdomain of the target network, and assigning an Internet reconnaissance score; collecting domain name system leak information by identifying improper network configurations in the internet protocol addresses and subdomains of the target network, and assigning a domain name system leak information score; identifying web applications used by the target network, analyzing web applications used by the target network to identify vulnerabilities in the web applications that could allow unauthorized access to the target network, and assigning a web application security score; identifying personnel within the target network, searching social media networks for information of concern related to the personnel identified within the target network, and assigning a social network score; conducting a scan of the target network for open TCP/UDP ports, and assigning an open port score, identifying leaked credentials associated with the target network that are found to be disclosed in previous breach incidents, and assigning a credential score; gathering version and update information for hardware and software systems within the boundary of the target network, checking version and update information for the hardware and software systems within the boundary of the target network, and assigning a patching frequency score; and identifying content of interest contained within the target network, performing an Internet search to identify references to the content of interest, and assigning an open-source intelligence score; and creating a weighted cybersecurity score by: assigning a weight to each of the Internet reconnaissance score, the domain name system leak information score, the web application security score, the social network score, the open port score, the credential score, the patching frequency score, and the open-source intelligence score; and combining the weighted scores into the weighted cybersecurity score; comparing the weighted cybersecurity score to a score set point; recommending changes to network security to either increase or decrease network security to bring the score into equilibrium with the score set point.

According to an aspect of an embodiment, computer tasks and programs are scheduled to run at arbitrary intervals.

According to an aspect of an embodiment, a system or network may be mapped using a plurality of internal, external, and internal data to display all network nodes and their connections across multiple lines of business

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE DRAWING FIGURES

Figure 1A:
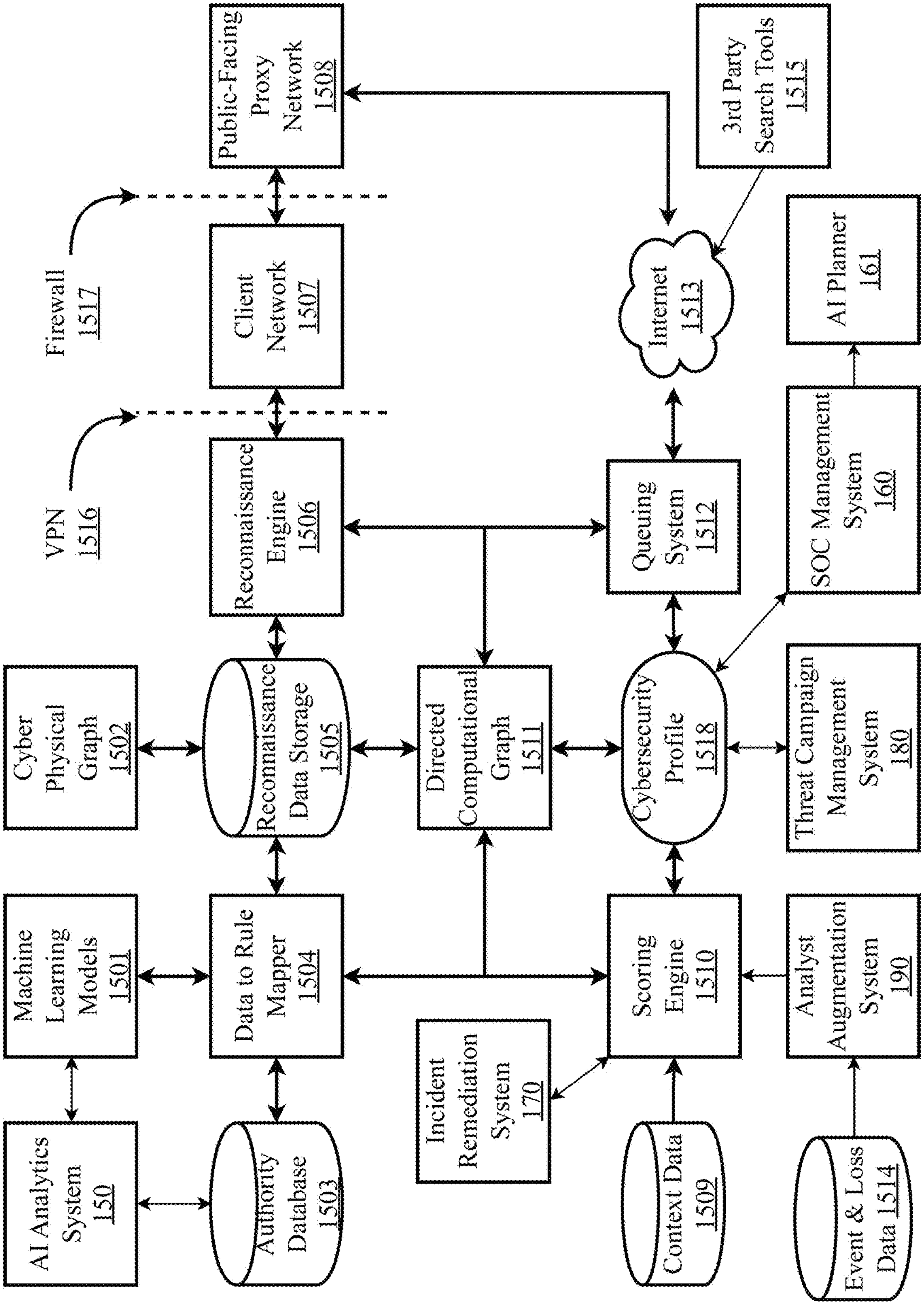
FIG. 1A is a block diagram illustrating an exemplary system including additional capabilities for an advanced cybersecurity system.

The inventor has conceived, and reduced to practice, a system and method for self-adjusting cybersecurity analysis with network mapping. The system and method comprise a scoring system in which a reconnaissance engine gathers data about a client's computer network from the client, from devices and systems on the client's network, and from the Internet regarding various aspects of cybersecurity. Each of these aspects is evaluated independently, weighted, and a cybersecurity score is generated. Each component is then further evaluated across, or relative to, the various aspects to further evaluate, validate, and adjust the cybersecurity score. The scoring system itself can be used as a state machine with the cybersecurity score acting as a feedback mechanism, in which a cybersecurity score can be set at a level appropriate for a given organization, allowing for a balance between the costs of increasing security versus the risks of loss associated with lesser security. Data from clients or groups of clients with more extensive reporting can be extracted, generalized, and applied to clients or groups of clients with less extensive reporting to enhance cybersecurity analysis and scoring where data are sub-optimal.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1A is a block diagram illustrating an exemplary system including additional capabilities for an advanced cybersecurity system. In one embodiment, an analyst augmentation system 190 may be integrated into system 1500 to allow for the identification of similar incidents based on a number of factors which may include but are not limited to, interconnectivity within the network may, patterns in log data, discreet sequencing of actions from all sources, and links to known campaigns of threat actors or threat-actor specific tactics, techniques, and procedures. Correlated events may be automatically aggregated to single incidents before being forwarded to a physical analyst. Additionally, the system may incorporate event and loss data 1514 into the analysis process where the results of the analysis impact the score generated by the scoring system 1510. The analyst augmentation system allows for the automated correlation of non-obvious relations between network events. The system may also enable reach back capabilities which may leverage an in-app chat to interact with other staff members who have responded to similar incidents, threat actors, or dealt with supported business units. This allows physical analysts to interact with one another and share information about incidents that are similar to one another. In order to effectively share information amongst physical analysts, the analyst augmentation system 190 may enable chatbot-based support for organizationally approved knowledge transfer and availability. This support feature may allow for the sharing of information such as but not limited to helpful resources, operating system commands, or even answers about organizational guidelines for response actions or reporting requirements for specific incident or event types.

A threat campaign management system 180 may be incorporated into system 1500 which enables organizations to identify potential root causes of attacks and business impacting disruptions from a threat actor. When a single event is detected using system 1500, multiple factors may be examined and contextual information may be utilized to identify many valid attack paths and potential impacts to network resilience. The threat campaign management system 180 may provide context from an actor perspective. The threat campaign management system 180 examines all events to identify where similar events are likely to be part of a larger campaign or are probabilistically aligned with specific types of lateral movement goals. The data from all events is incorporated into a scenario planning tool within the threat campaign management system 180 which runs multiple permutations of network configurations, user dispositions, and network events to identify the most likely scenario for a given attacker. As deeper insights are gathered, signatures and/or indicators of compromise associated with specific campaigns are identified based on the current phase in the attack cycle. This enables meaningful results from generic queries. Additionally, any results generated by the threat campaign management system 180 may be incorporated into the cybersecurity profile 1518, allowing for a more holistic look at a network's current threat detection and mitigation capabilities. Capabilities of the threat campaign management system 180 include but are not limited to, locating threat actor associated network events with the ability for certain matrix based searching and filtering, generating multi-scenario driven attack paths that explore the impact of multiple simultaneous threat actor intrusions in an environment, and probabilistic attribution based on events and attack path clustering compared to organizationally-constrained threat actor models. The threat campaign management system 180 may utilize both community driven threat actor models which leverage community efforts in addition to knowledge generated by system 1500.

In an embodiment, the system 1500 may include a Security Operations Center (SOC) management system 160. The SOC management system 160 includes the ability to enable the AI planner 161 to automatically review and route tickets and events to SOC analysts and incident responders who will be most effective in timely and successful remediation. The analysis may include diverse parameters including but not limited to shift times, skill sets, open issues, relationships between issues, friction points in the SOC, and previously remediated tickets and work by the available personnel. It also may include a manager-focused module to proactively identify friction points in operations, like funnel and dropoff analysis for open and historical events and incidents. The SOC management system 160 enable intelligent incident routing with the option to run in performance mode or training mode, focusing on maximum throughput or cross-training staff members respectively. Contextual security event routing ensures that tickets which are likely connected to other assigned tasks are routed to the same group of people. This allows teams to maximize the amount of information related to a particular intrusion or campaign by keeping all the information with the same group or individual. Identification of security friction points is an important part of managing an SOC. Using the SOC management system 160, the system 1500 may view response steps, timelines, and performance associated with SOC operations. The SOC management system 160 may utilize Sankey charts and dropoff charts to provide powerful visual tools for identifying where an SOC is understaffed and help streamline operations and future planning. Additionally, the SOC management system 160 may use Sankey diagrams and dropoff charts to allow for intuitive visual exploration of things such as but not limited to cyber events, incident source alerts, downstream results, and event source information.

The system 1500 may also include an incident remediation system 170 which may collect incident data and network security scores through the scoring engine 1510. The incident remediation system 170 offers the ability to review specific security incidents and consider all factors including network architecture, analyst assigned, business impact, and cost of remediation to generate a contextual plan for the optimal remediation path to close the specific incident. The incident remediation system 170 may automatically suggest new priorities and actions to help switch individual SOC team member' actions into a more integrated and performant whole. Capabilities of the incident remediation system 170 may include but are not limited to, incident remediation decision support suggesting discrete steps to close identified security incidents, cost-aware security operations suggesting taking into account current, available, and on-demand resources, and advances orchestration and automation driven by actual network context, where the incident remediation system 170 may be linked to advanced business-driven risk metrics.

The system 1500 may also incorporate an AI analytics system 150. The AI analytics system 2040 utilizes machine learning and AI which can be harnessed by internal security data science teams and analysists. The AI analytics system 150 enables organizations to create their own custom analytic data flows which may be stored in an authority database 1503 and may be implemented into system 1500. Some flows may include but are not limited to employing Spark-based jobs, rules, and Directed Computational Graph (DCG) orchestration pipelines for analytics involved in both detection and response. DCG orchestration tools aim to simplify the process of defining and executing complex data processing and machine learning workflows. They provide a high-level abstraction over the underlying infrastructure, enabling users to focus on defining the computational tasks and their dependencies without worrying about the low-level details of execution. Security domain experts may leverage a library of machine learning algorithms with tools to tune and train them on their own unique data and the ability to extend them or add new models they independently build. Models or algorithms may be incorporated and stored in machine learning models 1501 to be fully applied throughout system 1500. Through the AI analytics system 150, users may be able to orchestrate environment activities and secondary queries as part of the analytic pipeline using DCG orchestration. Additionally, parameter selection and hyper-parameter tuning capabilities allow for custom analytics tuned to a SOC's particular environment.

Figure 1B:
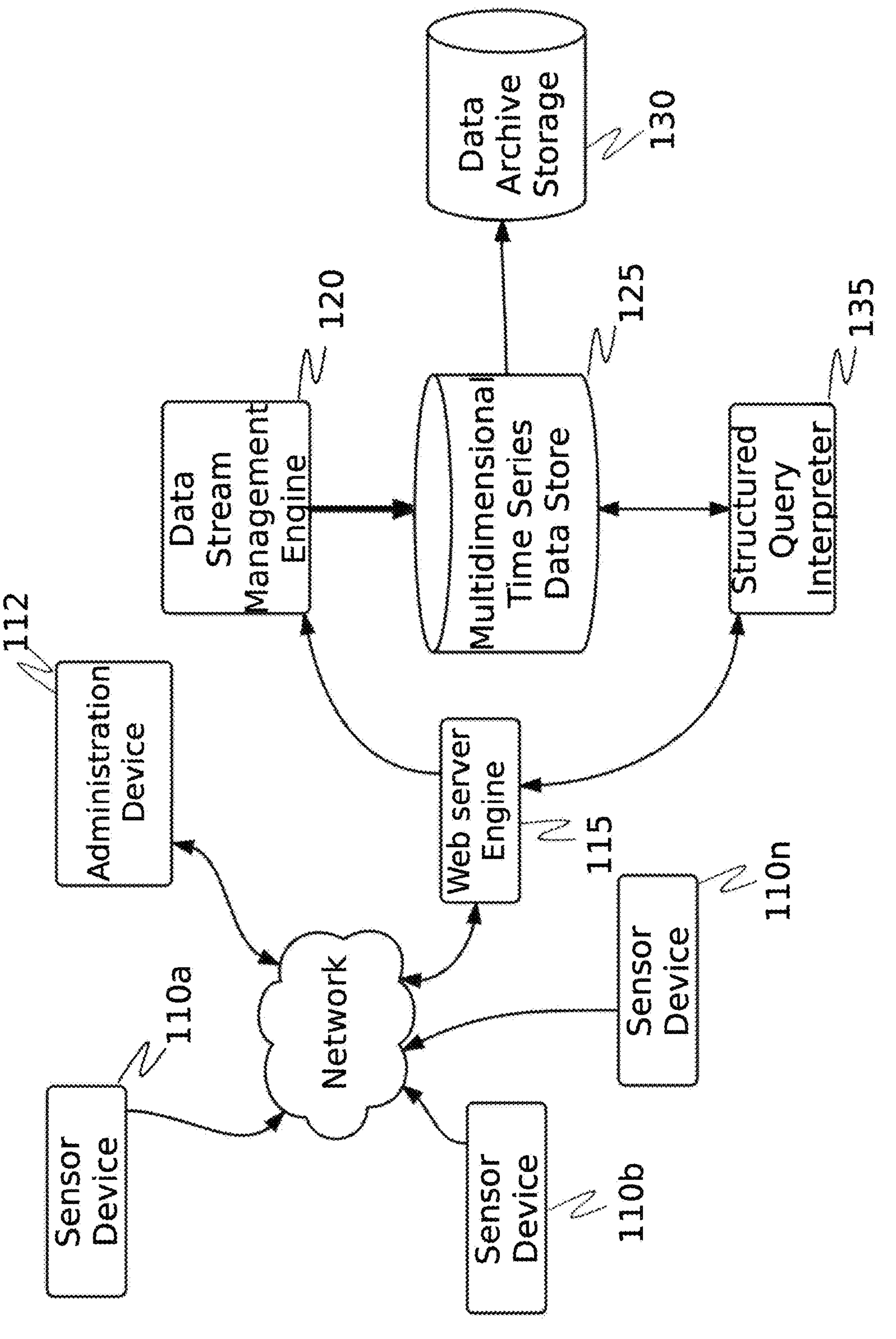
FIG. 1B (PRIOR ART) is a diagram of an exemplary architecture of a system for the capture and storage of time series data from sensors with heterogeneous reporting profiles according to an embodiment of the invention.

FIG. 1B (PRIOR ART) is a diagram of an exemplary architecture of a system for the capture and storage of time series data from sensors with heterogeneous reporting profiles according to an embodiment of the invention 100. In this embodiment, a plurality of sensor devices 110*a-n* stream data to a collection device, in this case a web server acting as a network gateway 115. These sensors 110*a-n* can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use a strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs. The embodiment uses a key-value pair data store examples of which are Risk, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64\times10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second(s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
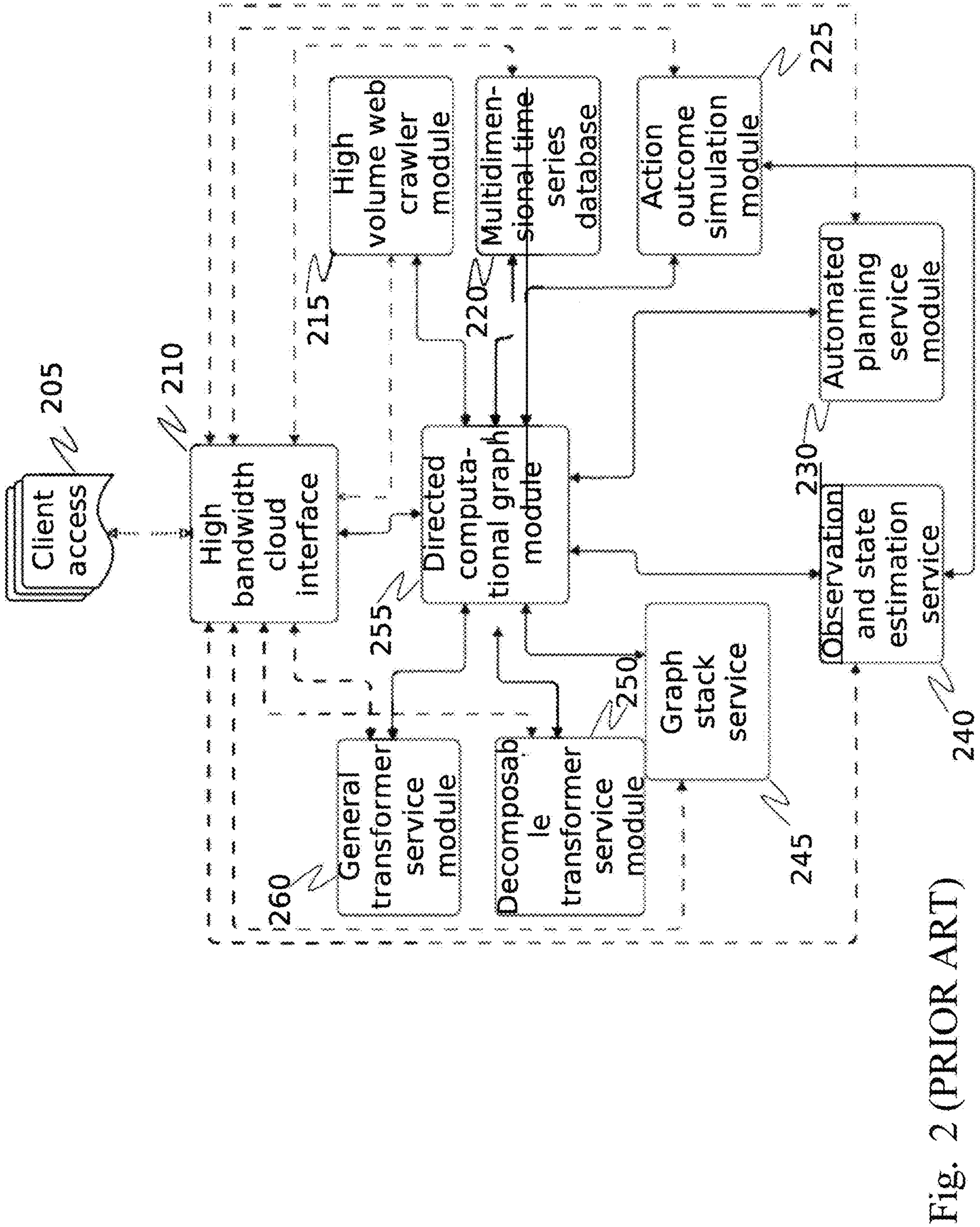
FIG. 2 (PRIOR ART) is a diagram of an exemplary architecture of a business operating system according to an embodiment of the invention.

FIG. 2 (PRIOR ART) is a diagram of an exemplary architecture of a business operating system 200 according to an embodiment of the invention. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web based sources that are not well tagged by conventional web crawling technology. Multiple dimension time series database module 220 receives data from a large plurality of sensors that may be of several different types. The module is designed to accommodate irregular and high volume surges by dynamically allotting network bandwidth and server processing channels to process the incoming data. Data retrieved by the multidimensional time series database 220 and the high volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible business decisions. Using all available data, the automated planning service module 230 may propose business decisions most likely to result in the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the affected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair but multiple tens of millions of dollars have been saved. This is just one example of a great many of the possible uses of the business operating system, those knowledgeable in the art will easily formulate more.

Figure 3:
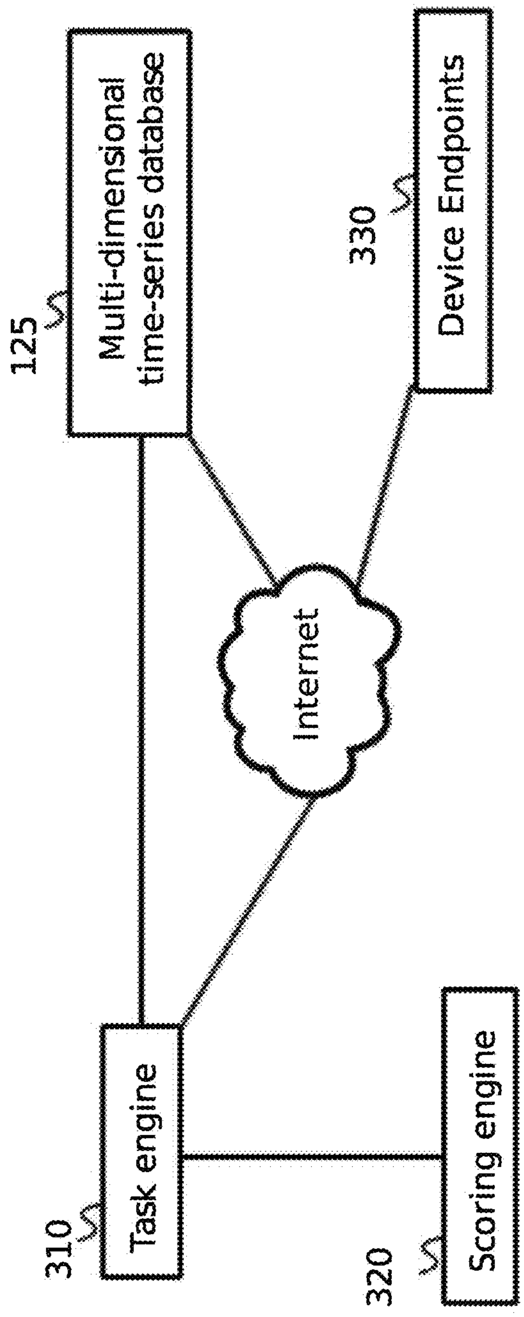
FIG. 3 is a diagram of an exemplary architecture of a cybersecurity analysis system according to an embodiment of the invention.

FIG. 3 is a system diagram, illustrating the connections between crucial components, according to an aspect of the invention. Core components include a scheduling task engine 310 which will run any processes and continue with any steps desired by the client, as described in further methods and diagrams in the disclosure. Tasks may be scheduled to run at specific times, or run for certain given amounts of time, which is commonplace for task scheduling software and systems in the art. This task engine 310 is then connected to the internet, and possibly to a single or plurality of local Multi-Dimensional Time-Series Databases (MDTSDB) 125. It is also possible to be connected to remotely hosted and controlled MDTSDB's 125 through the Internet, the physical location or proximity of the MDTSDB for this disclosure not being a limiting factor. In such cases as the MDTSDB 125 is not hosted locally, it must also maintain a connection to the Internet or another form of network for communication with the task engine 310. Device endpoints 330, especially Internet-of-Things (IoT) devices, are also by definition connected to the internet, and in methods described in later figures will be used for cybersecurity analysis and risk assessment. The task engine 310 which will perform the scheduling and running of the methods described herein also maintains a connection to the scoring engine 320, which will be used to evaluate data gathered from the analysis and reconnaissance tasks run by the task scheduling engine 310.

Figure 4:
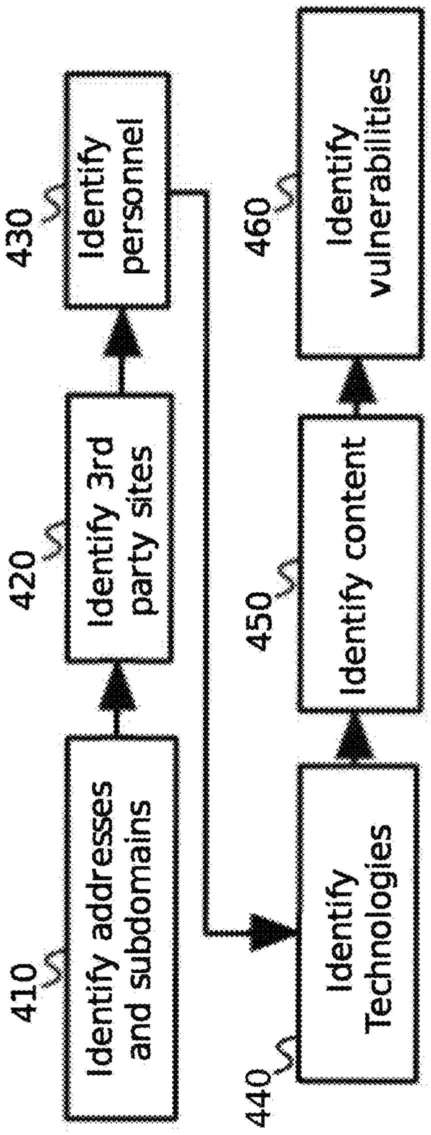
FIG. 4 is a method diagram illustrating key steps in passive cyber reconnaissance activities, according to an aspect.

FIG. 4 is a method diagram illustrating basic reconnaissance activities to establish network information for any given client. A first activity in establishing network boundaries and information is to identify Internet Protocol ("IP") addresses, domains, and/or subdomains 410 of the target network, to establish a scope for the remainder of activities directed at the network. It should be appreciated that a "target network" may comprise a subgraph of a cyber physical graph, wherein the target may be a business unit, a business process, a given region, etc. Once you have established network "boundaries" by probing and identifying the target IP addresses and subdomains 410, one can probe for and establish what relationships between the target and third-party or external websites and networks exist 420, if any. It is especially important to examine trust relationships and/or authoritative DNS record resolvers that resolve to external sites and/or networks. A next key step, according to an aspect, is to identify personnel involved with the target network, such as names, email addresses, phone numbers, and other personal information 430, which can be useful for social engineering activities, including illegal activities such as blackmail in extreme cases. After identifying personnel affiliated with the target network, another process in the method, according to an aspect, could be to identify versions and other information about systems, tools, and software applications in use by the target organization 440. This may be accomplished in a variety of ways, whether by examining web pages or database entries if publicly accessible, or by scraping information from the web about job descriptions associated with the organization or similar organizations—other methods to attain this information exist and may be used however. Another process in the method, according to an aspect, may be to identify content of interest 450 associated with the target, such as web and email portals, log files, backup or archived files, or sensitive information contained within Hypertext Markup Language ("HTML") comments or client-side scripts, such as ADOBE FLASH™ scripts for example. Using the gathered information and other publicly available information (including information which will be gathered in techniques illustrated in other figures), it is possible and critical to then identify vulnerabilities 460 from this available data, which can be exploited.

Figure 5:
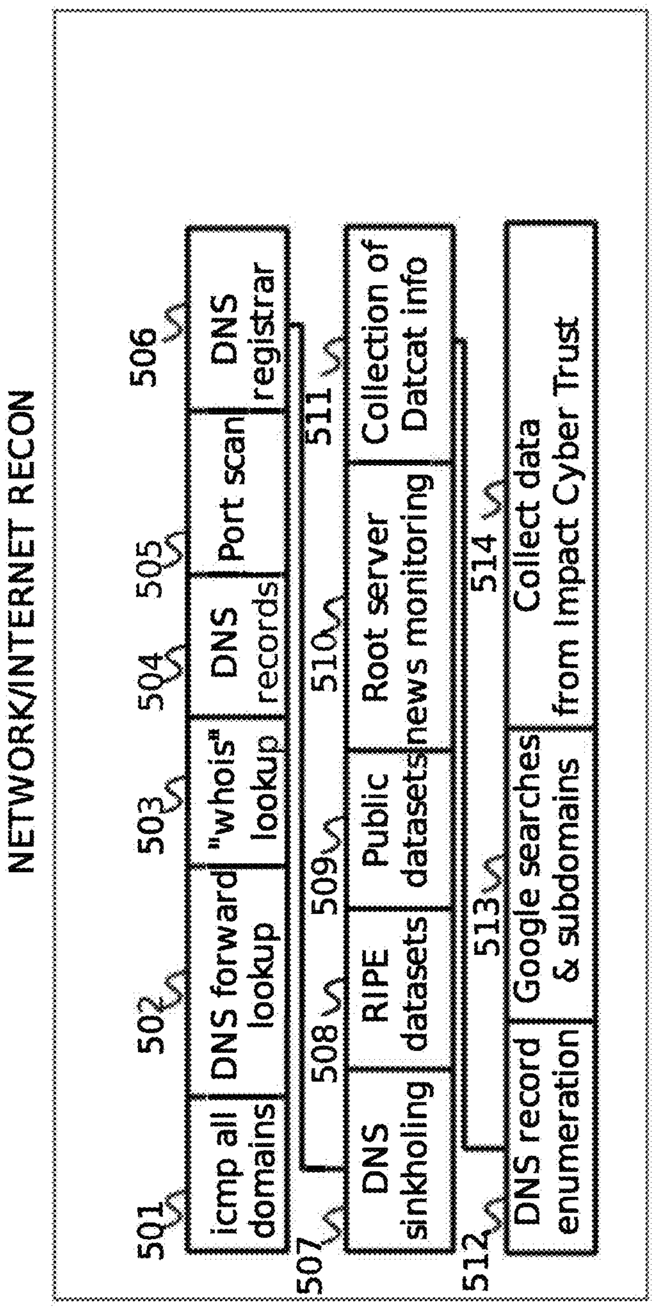
FIG. 5 is a method diagram illustrating activities and key steps in network and internet active reconnaissance, according to an aspect.

FIG. 5 is a method diagram illustrating and describing many activities and steps for network and internet based reconnaissance for cybersecurity purposes. The first step, according to an aspect, would be to use Internet Control Message Protocol (ICMP) to resolve what IP address each domain of the target resolves as 501. According to an aspect, another process in the method would be to perform a DNS forward lookup 502, using the list of subdomains of the target as input, generating a list of IP addresses as output. It is then possible to see if the IP addresses returned are within the net ranges discovered by a whois-which is a protocol used for querying databases for information related to assignees of an internet resource, including an IP address block, or domain name-check of the target's domain 503, and if not, perform additional whois lookups to determine if new associated net ranges are of interest, and then you may run a reverse DNS Lookup to determine the domains to which those addresses belong. A second use for whois lookups 503 is to determine where the site is hosted, and with what service—for example in the cloud, with Amazon Web Services, Cloudflare, or hosted by the target corporation itself. The next overall step in the process, according to an aspect, is to examine DNS records 504, with reverse IP lookups, and using certain tools such as dnscheck.ripe.net it is possible to see if other organizations share hosting space with the target. Other DNS record checks 504 include checking the Mail Exchange ("MX") record, for the Sender Policy Framework ("SPF") to determine if the domain is protected against emails from unauthorized domains, known commonly as phishing or spam, and other forms of email attack. Further examining the DNS MX record 504 allows one to examine if the target is self-hosting their email or if it is hosted in the cloud by another service, such as, for example, Google. DNS TXT records 504 may also be gathered for additional information, as defined by an aspect. The next overall step in the process is to conduct a port scan on the target network 505 to identify open TCP/UDP ports, and of any devices immediately recognizable, to find insecure or open ports on target IP addresses. Multiple tools for this exist, or may be constructed. Next, collecting the identity of the target's DNS registrar 506 should be done, to determine more information about their hosting practices. Another action in the method, according to an aspect, is to leverage the technology and technique of DNS sinkholing 507, a situation where a DNS server is set up to spread false information to clients that query information from it. For these purposes, the DNS sinkhole 507 may be used to redirect attackers from examining or connecting to certain target IP addresses and domains, or it can be set up as a DNS proxy for a customer in an initial profiling phase. There are possible future uses for DNS sinkholes 507 in the overall cybersecurity space, such as potentially, for example, allowing a customer to route their own requests through their own DNS server for increased security. The next overall step in network and internet reconnaissance, according to an aspect, is to use Réseaux IP Européens ("RIPE") datasets 508 for analytics, as seen from https://www.ripe.net/analyse/raw-data-sets which comprises: RIPE Atlas Raw Data, RIS Raw Data, Reverse DNS Delegations, IPv6 Web Statistics, RIPE NCC Active Measurements Of World IPv6 Day Dataset, RIPE NCC Active Measurements of World IPv6 Launch Dataset, iPlane traceroute Dataset, NLANR AMP Data, NLANR PMA Data, and WITS Passive Datasets. Another process in the method, according to an aspect, is to collect information from other public datasets 509 from scanning projects produced by academia and the government, including https://scans.io, and https://ant.isi.edu/datasets/all.html. These projects, and others, provide valuable data about the internet, about publicly accessible networks, and more, which may be acquired independently or not, but is provided for the public regardless to use for research purposes, such as cybersecurity evaluations. Another action in the method, according to an aspect, is to monitor the news events from the root server 510, for anomalies and important data which may be relevant to the security of the server. Another process in the method, according to an aspect, is to collect data from DatCat 511, an internet measurement data catalogue, which publicly makes available measurement data gathered from various scans of the internet, for research purposes. Another process in the method, according to an aspect, is to enumerate DNS records 512 from many groups which host website traffic, including Cloudflare, Akamai, and others, using methods and tools already publicly available on websites such as github. Technologies such as DNSRecon and DNSEnum exist for this purpose as well, as recommended by Akamai. Another action in the method, according to an aspect, is to collect and crawl Google search results 513 in an effort to build a profile for the target corporation or group, including finding any subdomains still not found. There is an entire category of exploit with Google searches that exploits the Google search technique and may allow access to some servers and web assets, such as exploits found at https://www.exploit-db.com/google-hacking-database/, and other exploits found online which may be used to help assess a target's security. It is important to see if the target is vulnerable to any of these exploits. Another action in the method, according to an aspect, is to collect information from Impact Cyber Trust 514, which possesses an index of data from many internet providers and may be useful for analyzing and probing certain networks.

Figure 6:
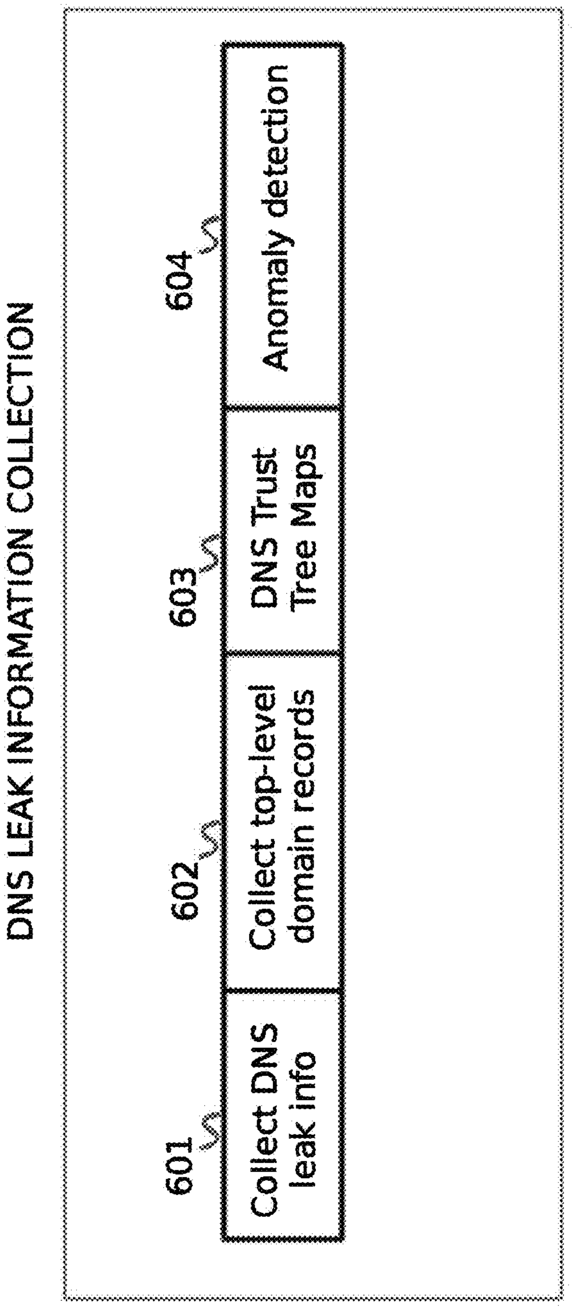
FIG. 6 is a method diagram illustrating activities and key steps in gathering leaked Domain Name System ("DNS") information for reconnaissance and control purposes, according to an aspect.

FIG. 6 is a method diagram illustrating key steps in collection of DNS leak information. A first step in this process would be, according to an aspect, to collect periodic disclosures of DNS leak information 601, whereby a user's privacy is insecure because of improper network configuration. Examples of improper network configurations can include, but are not limited to, incorrect virtual private network (VPN) setup, inconsistent DNS settings, IPv6 leaks, WebRTC leaks, Teredo tunneling, and improperly configured firewall or anti-virus software. A second step, according to an aspect, is to top-level domain records and information about top-level domain record health 602, such as reported by open-source projects available on websites such as Github. Another process in the method is to create a Trust Tree map 603 of the target domain, which is an open-source project available on Github (https://Github.com/mandatory-programmer/TrustTrees) but other implementations may be used of the same general process. A Trust Tree in this context is a graph generated by following all possible delegation paths for the target domain and generating the relationships between nameservers it comes across. This Trust Tree will output its data to a Graphstack Multidimensional Time-Series Database ("MDTSDB"), which grants the ability to record data at different times so as to properly understand changing data and behaviors of these records. The next step in this process is anomaly detection 604 within the Tree Trust graphs, using algorithms to detect if new references are being created in records (possible because of the use of MDTSDB's recording data over time), which may help with alerting one to numerous vulnerabilities that may be exploited, such as if a top level domain is hijacked through DNS record manipulation, and other uses are possible.

Figure 7:
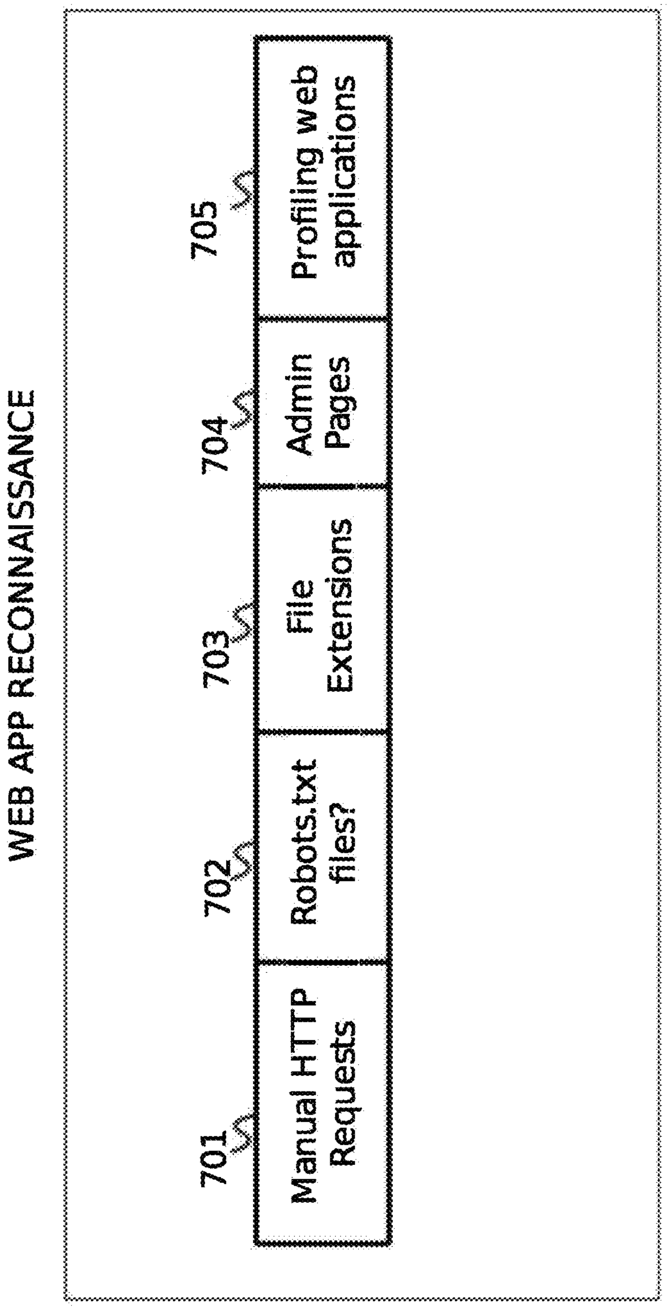
FIG. 7 is a method diagram illustrating activities and key steps in gathering information on web applications and technologies through active reconnaissance, according to an aspect.

FIG. 7 is a method diagram illustrating numerous actions and steps to take for web application reconnaissance. A first step, according to an aspect, is to make manual Hypertext Transfer Protocol ("HTTP") requests 701, known as HTTP/1.1 requests. Questions that are useful for network reconnaissance on the target that may be answered include whether the web server announces itself, and version number returned by the server, how often the version number changes which often indicates patches or technology updates, as examples of data possibly returned by such a request. A second step in the process is to look for a robots.txt file 702, a common type of file used to provide metadata to search engines and web crawlers of many types (including Google). This allows, among other possible things, to possibly determine what content management system (if any) the target may be using, such as Blogger by Google, or the website creation service Wix. Another process in the method for intelligence gathering on the target, is to fingerprint the application layer by looking at file extensions 703, HTML source, and server response headers, to determine what methods and technologies are used to construct the application layer. Another step is to examine and look for/admin pages 704 that are accessible and open to the public internet, which may be a major security concern for many websites and web-enabled technologies. The next step in this category of reconnaissance is to profile the web application of the target based on the specific toolset it was constructed with 705, for example, relevant information might be the WORDPRESS™ version and plugins they use if applicable, what version of ASP.NET™ used if applicable, and more. One can identify technologies from the target from many sources, including file extensions, server responses to various requests, job postings found online, directory listings, login splash pages (many services used to create websites and web applications have common templates used by many users for example), the content of a website, and more. Profiling such technology is useful in determining if they are using outdated or vulnerable technology, or for determining what manner of attacks are likely or targeted towards their specific technologies and platforms.

Figure 8:
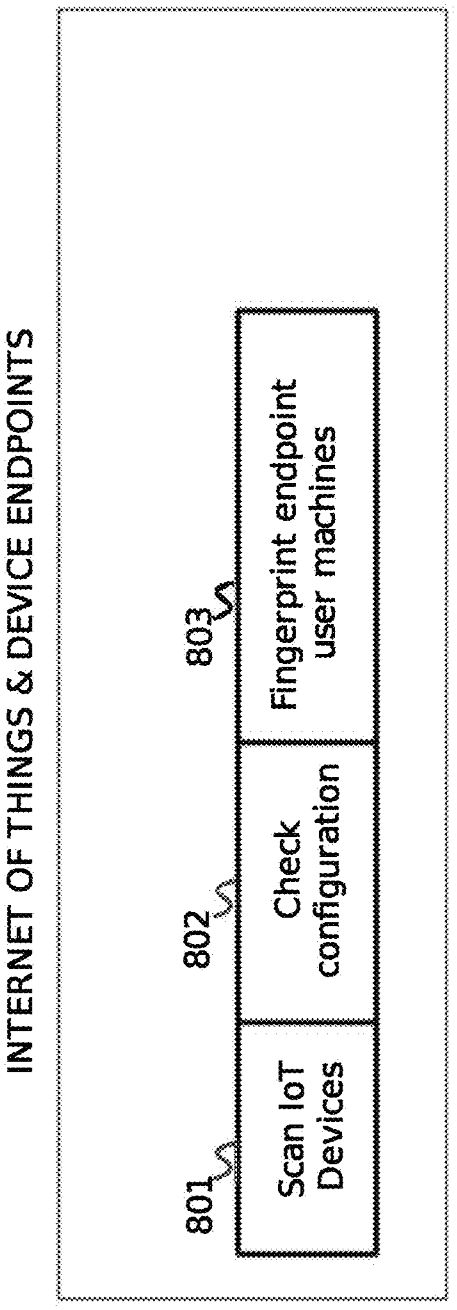
FIG. 8 is a method diagram illustrating activities and key steps in reconnaissance and information gathering on Internet-of-Things ("IoT") devices and other device endpoints, according to an aspect.

FIG. 8 is a method diagram illustrating steps to take for scanning the target for Internet Of Things (IoT) devices and other user device endpoints. The first step, according to an aspect, is to scan the target network for IoT devices 801, recognizable often by data returned upon scanning them. Another process in the method, according to an aspect, is to check IoT devices reached to see if they are using default factory-set credentials and configurations 802, the ability to do this being available in open-source scanners such as on the website Github. Default settings and/or credentials for devices often may be exploited. The next step, according to an aspect, is to establish fingerprints for user endpoint devices 803, meaning to establish identities and information about the devices connected over Transmission Control Protocol/Internet Protocol ("TCP/IP") that are often used by users such as laptops or tablets, and other devices that are internet access endpoints. It is important to establish versions of technology used by these devices when fingerprinting them, to notice and record changes in the MDTSDB in future scans.

Figure 9:
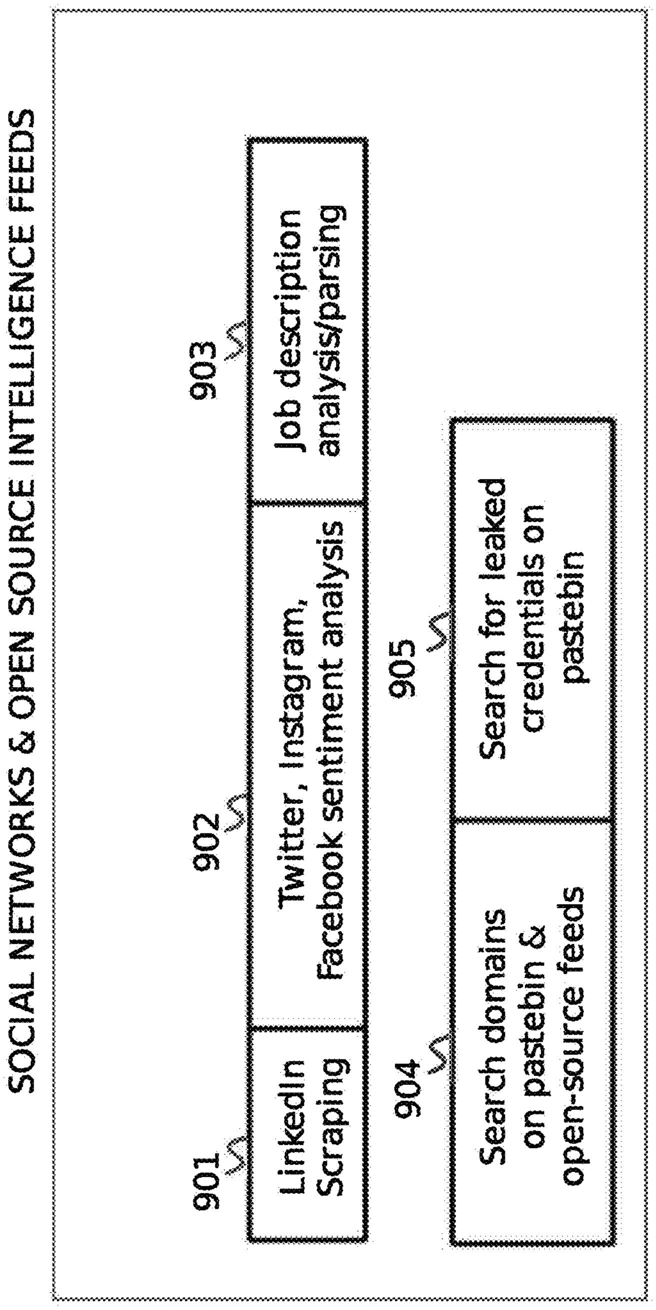
FIG. 9 is a method diagram illustrating activities and key steps in gathering intelligence through reconnaissance of social networks and open-source intelligence feeds ("OSINT"), according to an aspect.

FIG. 9 is a method diagram illustrating steps and actions to take to gather information on, and perform reconnaissance on, social networks and open-source intelligence feeds (OSINT). A first step is to scrape the professional social network LinkedIn 901 for useful information, including job affiliations, corporate affiliations, affiliations between educational universities, and more, to establish links between many actors which may be relevant to the security of the target. A second step to take, according to an aspect, is to perform a sentiment analysis on the popular social networks Instagram, Facebook, and Twitter 902. An analysis may, with proper technology and precision, provide information on potential attackers and agents which may be important to the security of the target, as well as establishing a time-series graph of behavioral changes which may affect the environment of the cybersecurity of the target. Another process in the method, according to an aspect, is to perform a job description analysis/parse 903, from the combination of social networks reviewed, so as to identify multiple pieces of relevant information for the target—such as known technologies used by the target, and possible actors that may be relevant to the target's cybersecurity. More than this, it is also possible that one can find information on actors related to the target that may be used against the target, for example in cases of industrial espionage. Other uses for such information exist relevant to the field of the invention, as in most cases of reconnaissance mentioned thus far. Another process in the method, according to an aspect, is to search domains on Pastebin and other open-source feeds 904. Finding useful information such as personal identifying information, domains of websites, and other hidden information or not-easily-obtained information on public sources such as Pastebin, is of incredible use for cybersecurity purposes. Such feeds and sources of public information are known as OSINT and are known to the field. Other information scrapable from Pastebin includes credentials to applications, websites, services, and more 905, which must be scraped and identified in order to properly mitigate such security concerns. Of particular importance is the identification of leaked credentials, specific to a target domain, that are found to be disclosed in previous breach incidents using open internet/dark web breach collection tools 905.

Figure 10:
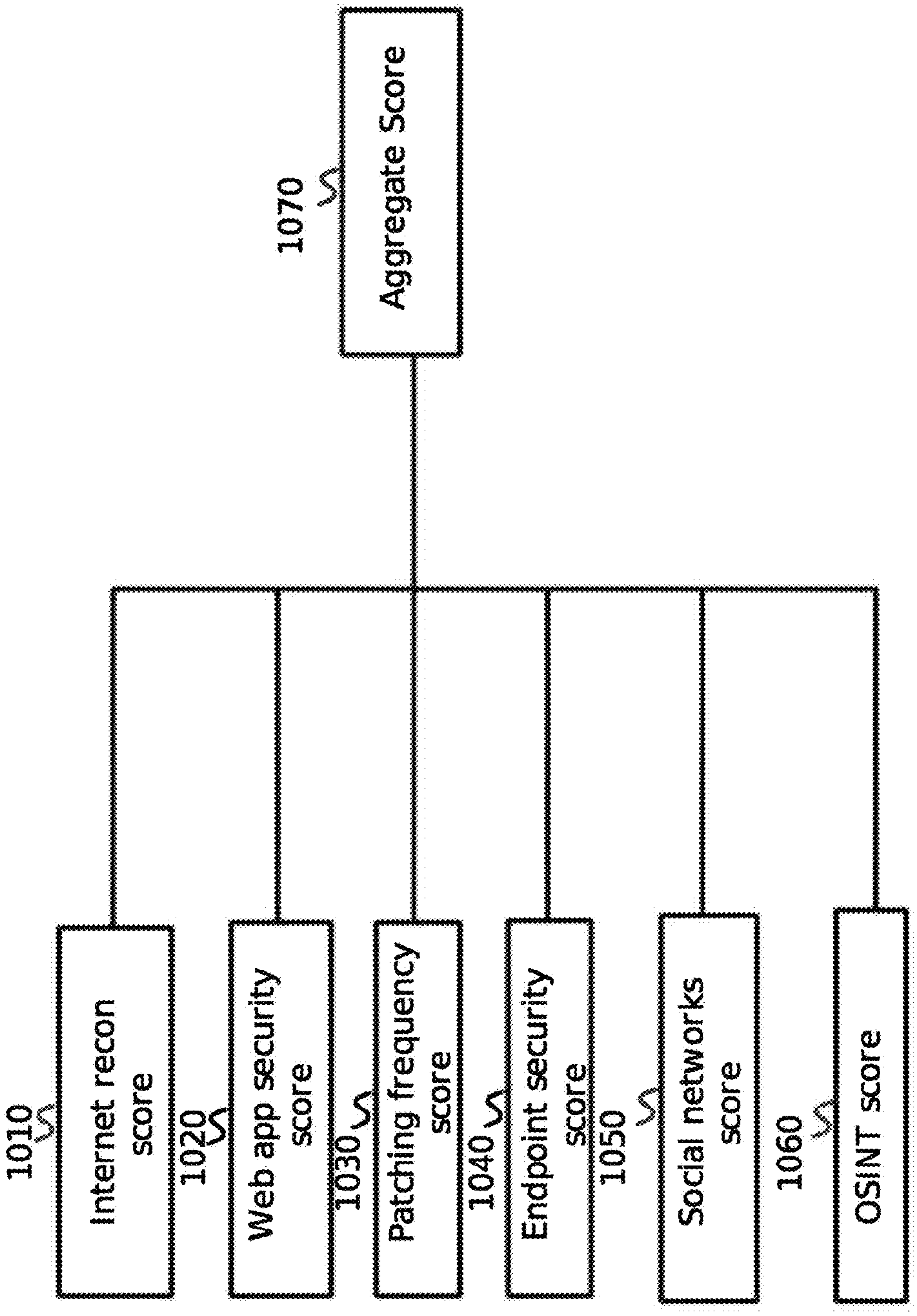
FIG. 10 is a method diagram illustrating the congregation of information from previous methods into a comprehensive cybersecurity score, using a scoring engine, according to an aspect.

FIG. 10 illustrates a basic system for congregating information from several previous methodologies into a comprehensive cybersecurity score of the analyzed target/customer. It is important to note that this scoring only aggregates information and thus scores the security of the target based on externally visible data sets. Once complete and comprehensive reconnaissance has been performed, all information from the internet reconnaissance 1010, FIG. 2 (PRIOR ART), web application security 1020, FIG. 7, patching frequency of the target websites and technologies 1030, FIG. 7, Endpoint and IoT security 1040, FIG. 8, social network security and sentiment analysis results 1050, FIG. 9, and OSINT reconnaissance results 1060, FIG. 9. All of these sources of information are gathered and aggregated into a score, similar to a credit score, for cybersecurity 1070, the scoring method of which may be changed, fine-tuned, and otherwise altered either to suit customer needs or to suit the evolving field of technologies and information relevant to cybersecurity. This score represents the sum total of security from the reconnaissance performed, as far as externally visible data is concerned, a higher score indicating higher security, from a range of 250 to 850. Up to 400 points may be accrued for internet security 1010, up to 200 points may be accrued for web application security 1020, 100 points may be gained for a satisfactory patching frequency of technologies 1030, and all remaining factors 1040, 1050, 1060 of the score may award up to 50 points for the target, if perfectly secure.

Figure 11:
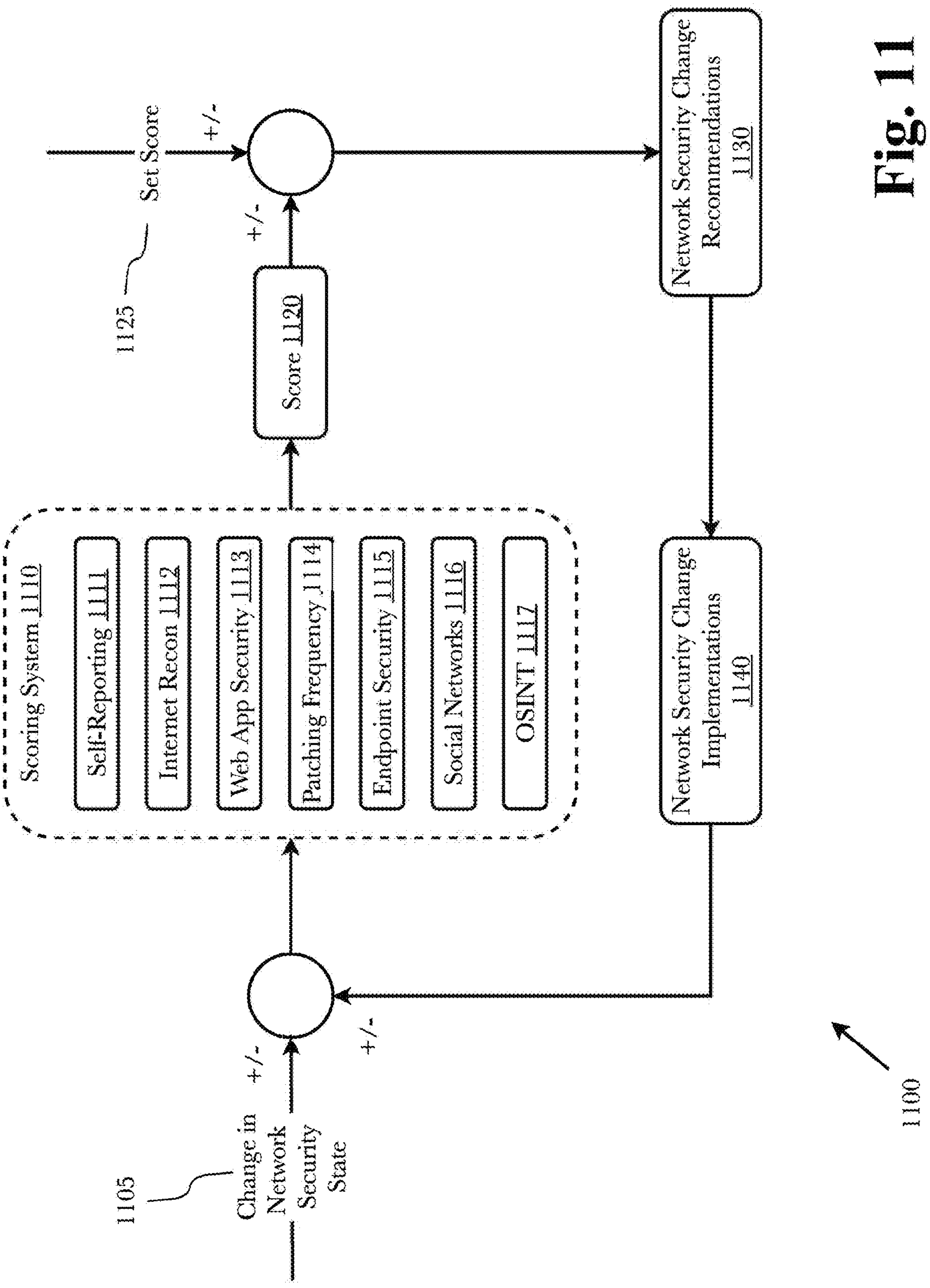
FIG. 11 is a diagram illustrating how the scoring system can be used as a feedback loop to establish and maintain a level of security appropriate to a given organization.

FIG. 11 is a diagram illustrating how the scoring system can be used as a feedback loop 1100 to establish and maintain a level of security appropriate to a given organization. This feedback loop is similar in function to feedbacks for control systems, and may be implemented in software, hardware, or a combination of the two, and aspects of the control system may be automatically or manually implemented. A scoring system 1110 can be represented as a system comprising subsystems for various aspects of cybersecurity scoring, i.e., self-reporting/self-attestation 1111, internet reconnaissance 1112, web application security 1113, software/firmware updates and patching frequency 1114, endpoint security 1115, social networks 1116, and open source intelligence (OSINT) 1117. Each subsystem representing an aspect of cybersecurity may analyze data gathered for that aspect and generate its own score related to that aspect. The scores from each subsystem may be combined in some fashion to arrive at an overall cybersecurity score 1120 for a given computer system or computer network. This combination may take any number of forms, for example, summation, averaging, weighted averaging, or any other appropriate algorithm or methodology for creating a single score from multiple scores. The overall cybersecurity score 1120 is compared against a score setting 1125, which may be set automatically by the system based on certain parameters, or may be set manually by a user of the system knowledgeable about the organization's infrastructure, risk tolerance, resources, etc. Based on the comparison, network security changes 1130 are recommended, including a recommendation for no change where the overall cybersecurity score 1120 is at or close to the score setting. Where the score 1120 is above or below the set score 1125, changes to network security may be implemented 1140, either automatically or manually, to loosen or tighten network security to bring the score 1120 back into equilibrium with the set score 1125. A change to any one of the aspects of cybersecurity 1111-1117 would constitute a change in the network security state 1105 which, similar to control systems, would act as an input disturbance to the system and propagate through the feedback loop until equilibrium between the score 1120 and set score 1125 is again achieved.

As in control systems, the feedback loop may be dynamically adjusted in order to cause the overall cybersecurity score 1120 to come into equilibrium with the set score 1125, and various methods of accelerating or decelerating network security changes may be used. As one example, a proportional-integral-derivative (PID) controller or a state-space controller may be implemented to predictively reduce the error between the score 1120 and the set score 1125 to establish equilibrium. Increases in the magnitude of the error, accelerations in change of the error, and increases in the time that the error remains outside of a given range will all lead to in corresponding increases in tightening of network security (and vice-versa) to bring the overall cybersecurity score 1120 back in to equilibrium with the set score 1125.

Figure 12:
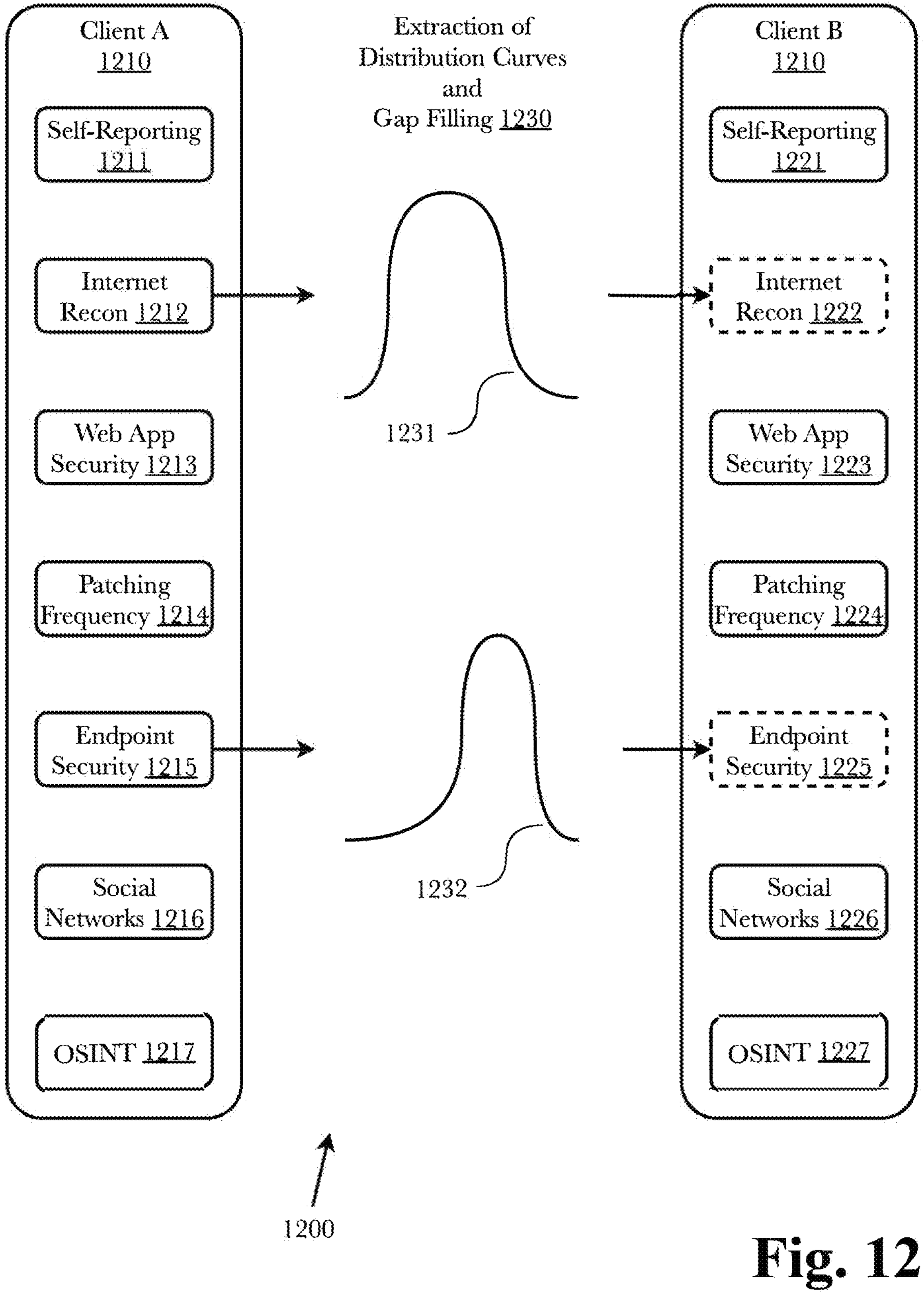
FIG. 12 is a diagram illustrating the use of data from one client to fill gaps in data for another client to improve cybersecurity analysis and scoring.

FIG. 12 is a diagram illustrating the use of data from one client to fill gaps in data for another client 1200 to improve cybersecurity analysis and scoring. In any given group of organizations, some organizations will have a more complete set of data regarding some aspects of cybersecurity analysis and scoring than other organizations. For example, large corporate clients will have extensive network security logs, a large Internet profile, frequently patched and updated systems, and a large staff of IT professionals to self-report data. Smaller clients and individuals will have little or none of those characteristics, and therefore a much smaller set of data on which to base cybersecurity analyses, recommendations, and scoring. However, generalized data and trends from larger and/or more “data rich” organizations can be used to fill in gaps in data for smaller and/or more “data poor” organizations. In this example, Client A 1210 is a large organization with an extensive Internet presence and a large staff of IT professionals. Thus, the Internet reconnaissance data 1212 for Client A 1210 will contain a broad spectrum of data regarding the organization’s online presence and vulnerabilities of that and similar organizations, and the social network data 1226 of Client A will contain a rich set of data for many employees and their usage of social media. Client A’s 1210 self-reporting 1211 and other aspects of cybersecurity analysis 1212-1217 are likely to contain much more detailed data than a smaller organization with fewer resources. Client B 1220, on the other hand, is a much smaller organization with no dedicated IT staff. Client B 1220 will have a much smaller Internet presence, possibly resulting in Internet reconnaissance data 1222 containing little or no information available other than whois and DNS records. Client B 1220 is also unlikely to have any substantial social network data 1226, especially where Client B 1220 does not require disclosure of social media usage. Client B’s 1220 self-reporting data 1221 and other aspects 1222-1227 are also likely to contain substantially less data, although in this example it is assumed that Client B’s 1220 self-reporting data 1221, web app security data 1223, version, update, and patching frequency data 1224, endpoint security 1225, social network data 1226, and OSINT data 1227 are sufficient for cybersecurity analysis.

Extraction of data (e.g., distribution curves) and gap filling 1230 may be used to fill in missing or insufficient data in order to perform more accurate or complete analyses. The distribution, trends, and other aspects 1231 of Client B’s 1220 Internet reconnaissance data 1212 and the distribution, trends, and other aspects 1232 of Client B’s 1220 social network data 1212 may be extracted and use to fill gaps in Client A’s 1210 Internet reconnaissance data 1222 and social network data 1226 to improve cybersecurity analyses for Client A 1210 without requiring changes in Client A’s 1210 infrastructure or operations. In some embodiments, synthetic data will be generated from the distributions, trends, and other aspects to use as gap-filling data in a format more consistent with the data for Client A 1210. While a single Client A 1210 and Client B 1220 are shown for purposes of simplicity, this process may be expanded to any number of clients with greater data representation and any number of clients with lesser data representation.

Figure 13:
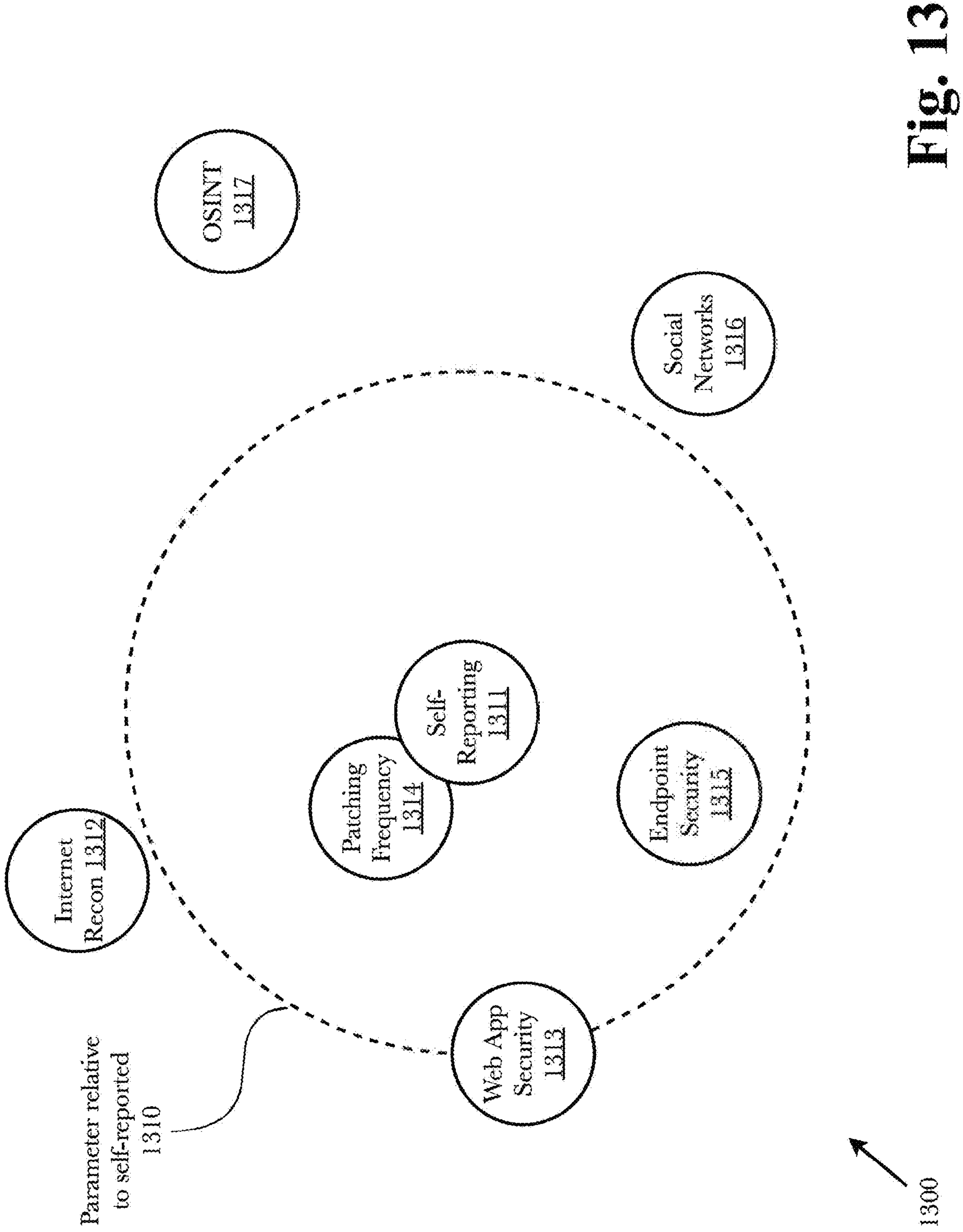
FIG. 13 is a diagram illustrating cross-referencing and validation of data across different aspects of a cybersecurity analysis.

FIG. 13 is a diagram illustrating cross-referencing and validation of data across different aspects of a cybersecurity analysis 1300. For any given parameter, cross-referencing and validation may be performed across data sets representing various aspects of cybersecurity analysis. In this example, a certain parameter 1310 (e.g., number of security breaches in a given area or aspect) is selected from self-reported data 1311, and compared against the same or a similar parameter for other data sets representing aspects of cybersecurity analysis 1312-1317. A range or threshold may be established for the parameter 1310, as represented by the dashed line. The relative distance from the self-reported data 1311 may be calculated, and aspects of cybersecurity falling outside of the range or threshold may be identified. In this example for instance, versions, updates, and patching frequency 1314 are relatively close to the self-reported data 1311, and fall within the threshold established for the parameter 1310. Endpoint security 1315 and web app security 1313 are further from the self-reported value 1311, but still within the range or threshold of the parameter 1310. However, the values for Internet reconnaissance 1312, social networks 1316, and OSINT 1317 fall outside of the range or threshold of the parameter 1310, and therefore warrant further action. The action may be, for example, re-assessing the scores associated with patching frequency 1314, endpoint security 1315, and social networks 1316 to ensure that the data for those aspects is consistent and/or valid, or other measures designed to improve scoring accuracy and consistency.

Figure 14:
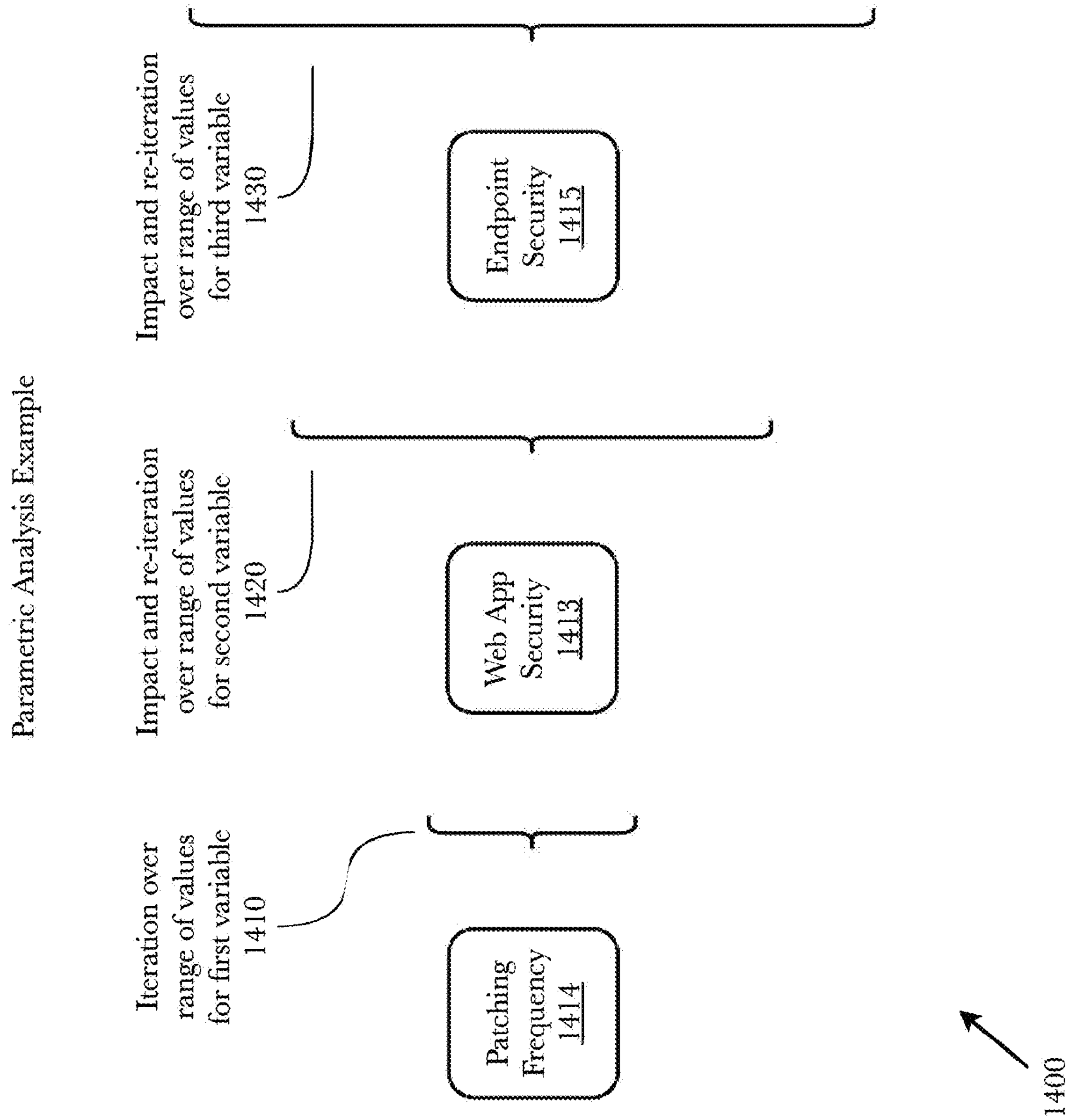
FIG. 14 is a diagram illustrating parametric analysis of an aspect of cybersecurity analysis.

FIG. 14 is a diagram illustrating parametric analysis of an aspect of cybersecurity analysis 1400. Parametric analysis is the process of iterating an analysis over a range of values of a parameter to see how the different values of the parameter affect the overall system in which the parameter is used. In this example, patching frequency 1414 is used as the parameter with the range of value 1410 ranging, for example, from none to daily. As the patching frequency 1414 parameter is iterated over the range of values 1410, its impact is evaluated on web app security 1413, which is likely to have a broader impact and range of values 1420 which, in turn, will have knock-on impacts and a likely broader range of values 1430 for endpoint security 1415. While it is not necessarily the case that parametric analysis will increase the range of values at each stage of analysis of the overall system, parametric analysis over complex systems tends to have an exponentially-increasing set of possible outcomes. Various methodologies may be used to reduce complexity, state space, and uncertainty in parametric analyses of complex systems.

Figure 15:
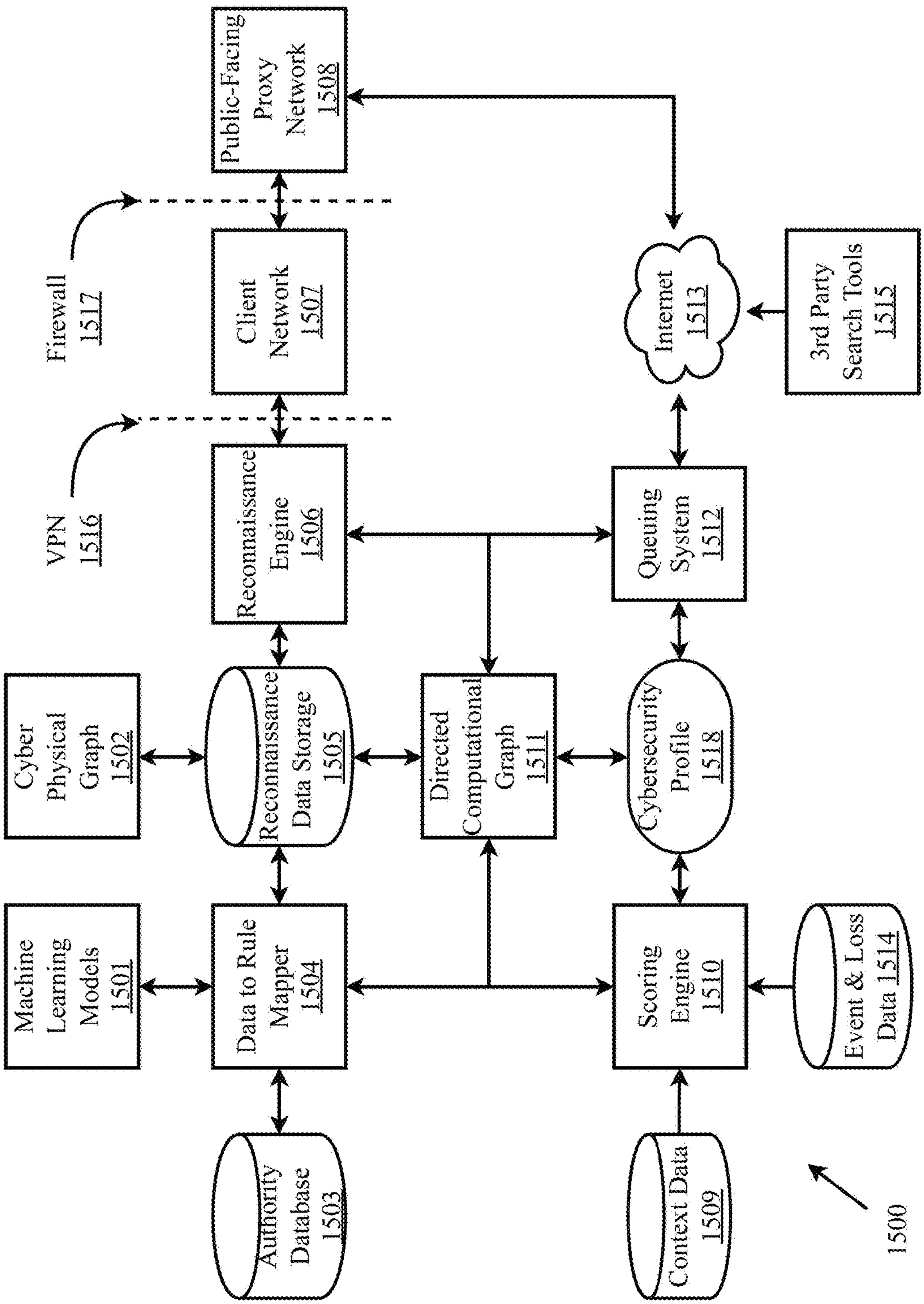
FIG. 15 is block diagram showing an exemplary system architecture for a system for cybersecurity profiling and rating.

FIG. 15 is block diagram showing an exemplary system architecture 1500 for a system for cybersecurity profiling and rating. The system in this example contains a cyber-physical graph 1502 which is used to represent a complete picture of an organization’s infrastructure and operations including, importantly, the organization’s computer network infrastructure particularly around system configurations that influence cybersecurity protections and resiliency. The system further contains a directed computational graph 1511, which contains representations of complex processing pipelines and is used to control workflows through the system such as determining which 3rd party search tools 1515 to use, assigning search tasks, and analyzing the cyber-physical graph 1502 and comparing results of the analysis against reconnaissance data received from the reconnaissance engine 1506 and stored in the reconnaissance data storage 1505. In some embodiments, the determination of which 3rd party search tools 1515 to use and assignment of search tasks may be implemented by a reconnaissance engine 1506. The cyber-physical graph 1502 plus the analyses of data directed by the directed computational graph on the reconnaissance data received from the reconnaissance engine 1506 are combined to represent the cyber-security profile 1518 of the client organization whose network 1507 is being evaluated. A queuing system 1512 is used to organize and schedule the search tasks requested by the reconnaissance engine 1506. A data to rule mapper 1504 is used to retrieve laws, policies, and other rules from an authority database 1503 and compare reconnaissance data received from the reconnaissance engine 1506 and stored in the reconnaissance data storage 1505 against the rules in order to determine whether and to what extent the data received indicates a violation of the rules. Machine learning models 1501 may be used to identify patterns and trends in any aspect of the system, but in this case are being used to identify patterns and trends in the data which would help the data to rule mapper 1504 determine whether and to what extent certain data indicate a violation of certain rules. A scoring engine 1510 receives the data analyses performed by the directed computational graph 1511, the output of the data to rule mapper 1504, plus event and loss data 1514 and contextual data 1509 which defines a context in which the other data are to be scored and/or rated. A public-facing proxy network 1508 is established outside of a firewall 1517 around the client network 1507 both to control access to the client network from the Internet 1513, and to provide the ability to change the outward presentation of the client network 1507 to the Internet 1513, which may affect the data obtained by the reconnaissance engine 1506. In some embodiments, certain components of the system may operate outside the client network 1507 and may access the client network through a secure, encrypted virtual private network (VPN) 1516, as in a cloud-based or platform-as-a-service implementation, but in other embodiments some or all of these components may be installed and operated from within the client network 1507.

As a brief overview of operation, information is obtained about the client network 1507 and the client organization's operations, which is used to construct a cyber-physical graph 1502 representing the relationships between devices, users, resources, and processes in the organization, and contextualizing cybersecurity information with physical and logical relationships that represent the flow of data and access to data within the organization including, in particular, network security protocols and procedures. The directed computational graph 1511 containing workflows and analysis processes, selects one or more analyses to be performed on the cyber-physical graph 1502. Some analyses may be performed on the information contained in the cyber-physical graph, and some analyses may be performed on or against the cyber-physical graph using information obtained from the Internet 1513 from reconnaissance engine 1506. The workflows contained in the directed computational graph 1511 select one or more search tools to obtain information about the organization from the Internet 1515, and may comprise one or more third party search tools 1515 available on the Internet. As data are collected, they are fed into a reconnaissance data storage 1505, from which they may be retrieved and further analyzed. Comparisons are made between the data obtained from the reconnaissance engine 1506, the cyber-physical graph 1502, the data to rule mapper, from which comparisons a cybersecurity profile of the organization is developed. The cybersecurity profile is sent to the scoring engine 1910 along with event and loss data 1514 and context data 1509 for the scoring engine 1510 to develop a score and/or rating for the organization that takes into consideration both the cybersecurity profile, context, and other information.

Figure 16:
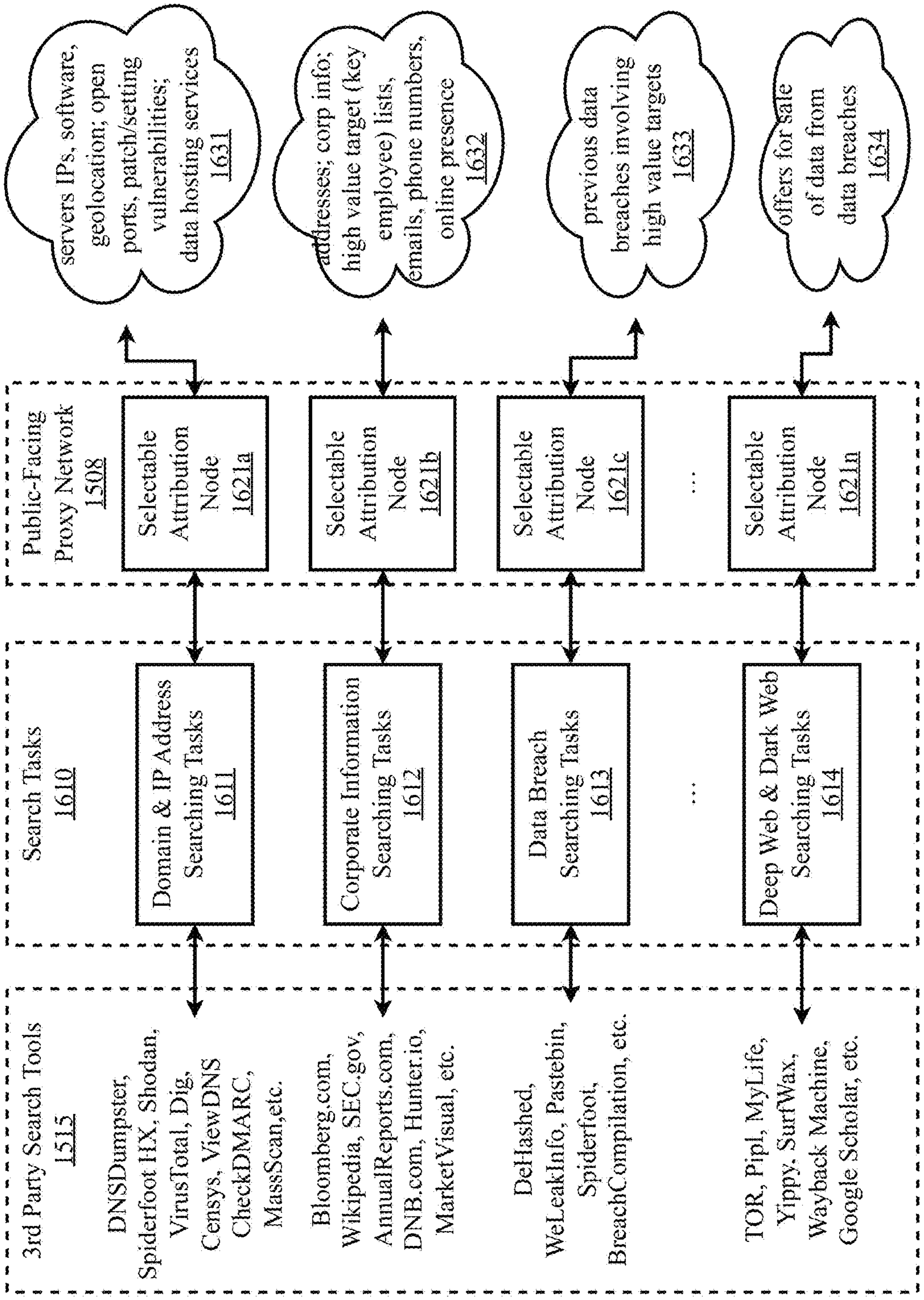
FIG. 16 is a relational diagram showing the relationships between exemplary 3$^{rd}$ party search tools, search tasks that can be generated using such tools, and the types of information that may be gathered with those tasks.

FIG. 16 is a relational diagram showing the relationships between exemplary 3rd party search tools 1515, search tasks 1610 that can be generated using such tools, and the types of information that may be gathered with those tasks 1611-1614, and how a public-facing proxy network 1508 may be used to influence the search task results. While the use of 3rd party search tools 1515 is in no way required, and proprietary or other self-developed search tools may be used, there are numerous 3rd party search tools 1515 available on the Internet, many of them available for use free of charge, that are convenient for purposes of performing external and internal reconnaissance of an organization's infrastructure. Because they are well-known, they are included here as examples of the types of search tools that may be used and the reconnaissance data that may be gathered using such tools. The search tasks 1610 that may be generated may be classified into several categories. While this category list is by no means exhaustive, several important categories of reconnaissance data are domain and internet protocol (IP) address searching tasks 1611, corporate information searching tasks 1612, data breach searching tasks 1613, and dark web searching tasks 1614. Third party search tools 1515 for domain and IP address searching tasks 1611 include, for example, DNSDumpster, Spiderfoot HX, Shodan, VirusTotal, Dig, Censys, ViewDNS, and CheckDMARC, among others. These tools may be used to obtain reconnaissance data about an organization's server IPs, software, geolocation; open ports, patch/setting vulnerabilities; data hosting services, among other data 1631. Third party search tools 1515 for corporate information searching tasks 1612 include, for example, Bloomberg.com, Wikipedia, SEC.gov, AnnualReports.com, DNB.com, Hunter.io, and MarketVisual, among others. These tools may be used to obtain reconnaissance data about an organization's addresses; corp info; high value target (key employee or key data assets) lists, emails, phone numbers, online presence 1632. Third party search tools 1515 for data breach searching tasks 1613 include, for example, DeHashed, WeLeakInfo, Pastebin, Spiderfoot, and BreachCompilation, among others. These tools may be used to obtain reconnaissance data about an organization's previous data breaches, especially those involving high value targets, and similar data loss information 1633. Third party search tools 1515 for deep web (reports, records, and other documents linked to in web pages, but not indexed in search results . . . estimated to be 90% of available web content) and dark web (websites accessible only through anonymizers such as TOR . . . estimated to be about 6% of available web content) searching tasks 1614 include, for example, Pipl, MyLife, Yippy, SurfWax, Wayback machine, Google Scholar, DuckDuckGo, Fazzle, Not Evil, and Start Page, among others. These tools may be used to obtain reconnaissance data about an organization's lost and stolen data such as customer credit card numbers, stolen subscription credentials, hacked accounts, software tools designed for certain exploits, which organizations are being targeted for certain attacks, and similar information 1634. A public-facing proxy network

1508 may be used to change the outward presentation of the organization's network by conducting the searches through selectable attribution nodes 1621*a-n*, which are configurable to present the network to the Internet in different ways such as, but not limited to, presenting the organization network as a commercial IP address, a residential IP address, or as an IP address from a particular country, all of which may influence the reconnaissance data received using certain search tools.

Figure 17:
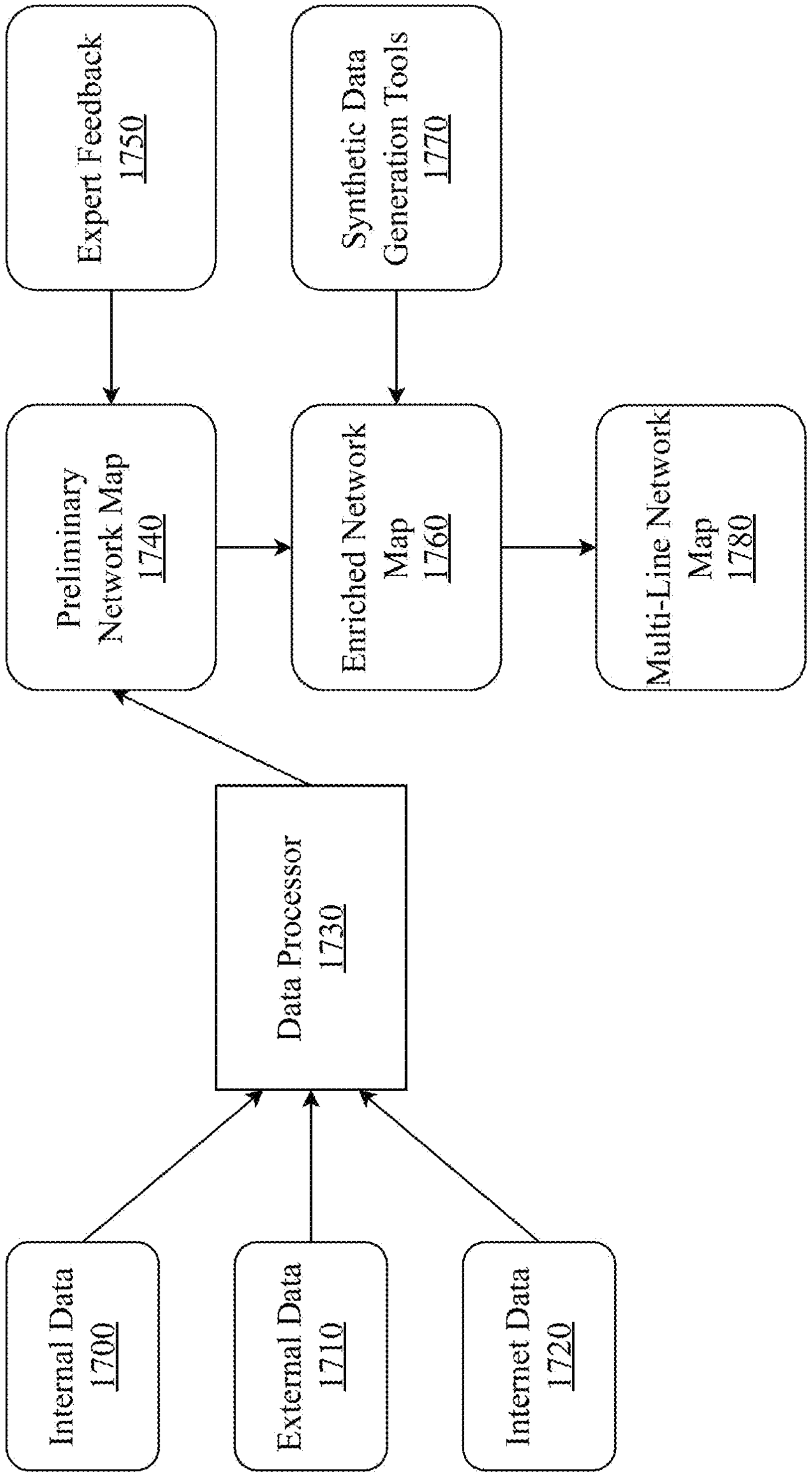
FIG. 17 is a block showing diagram showing an exemplary system architecture for a system that creates a multi-line network map.

FIG. 17 is a block showing a diagram showing an exemplary system architecture for a system that creates a multi-line network map. A plurality of data may be collected from a plurality of sources where the data includes but is not limited to internal data 1700, external data 1710, and internet data 1720. Internal data refers to information gathered from within the organization's network, such as network device configurations, log files, and performance metrics. External data includes information obtained from third-party sources, such as government databases, industry reports, and market research. Internet data encompasses publicly available information found online, such as news articles, social media posts, and online forums related to the network industry.

The collected data may then be fed into a data processor 1730, which is responsible for a plurality of processing tasks including but not limited to cleaning, normalizing, and analyzing the raw data. The data processor employs various techniques, such as data mining, natural language processing, and machine learning algorithms, to extract relevant information and identify patterns and relationships within the data. The processed data is used to generate a preliminary network map 1740, which provides a basic visualization of the network assets and their interconnections. This initial map may include information such as but not limited to the location of network nodes, the type of equipment used, and the capacity of each link. Generally, the preliminary network map 1740 will focus on a single line of business, for example, financial services.

To further enhance the accuracy and usefulness of the network map, the system incorporates expert feedback 1750. Domain experts, such as network engineers, analysts, and industry professionals, review the preliminary map and provide insights, corrections, and additional information based on their knowledge and experience. This feedback is used to refine the network map and fill in any gaps or inconsistencies. The result of incorporating expert feedback is an enriched network map 1760, which offers a more comprehensive and accurate representation of the network assets. This enriched map includes detailed information about each asset, such as its performance characteristics, maintenance history, and interdependencies with other assets. To further expand the capabilities of the system, synthetic data generation tools 1770 may be employed. Synthetic data generation tools are software programs or suites that create this artificial data. These tools use various statistical models and machine learning algorithms to analyze patterns in real data and generate new data points that exhibit similar characteristics. These tools may use advanced algorithms and simulation techniques to create realistic, yet fictional, network scenarios and datasets. The synthetic data is used to test and validate the accuracy of the network map, as well as to explore potential future scenarios and what-if analyses. Synthetic data refers to data that is artificially generated rather than collected from real-world events. It is created algorithmically, and is intended to mimic the statistical properties and patterns of real data without containing any of the original, potentially sensitive, information.

The enriched network map and the synthetic data are combined to create a multi-line network map 1780. This final output provides a holistic view of the network, encompassing multiple layers of information, such as physical infrastructure, logical topology, and service delivery. The multi-line network map enables network operators, planners, and decision-makers to gain a deep understanding of their network assets and more thoroughly identify possible security concerns within their network. The enriched network map may provide a multi-line business perspective which encompasses a variety of business aspects. By providing a more holistic view of a business's network infrastructure, threats can be more easily detected and vulnerabilities may be identified more efficiently.

Figure 18:
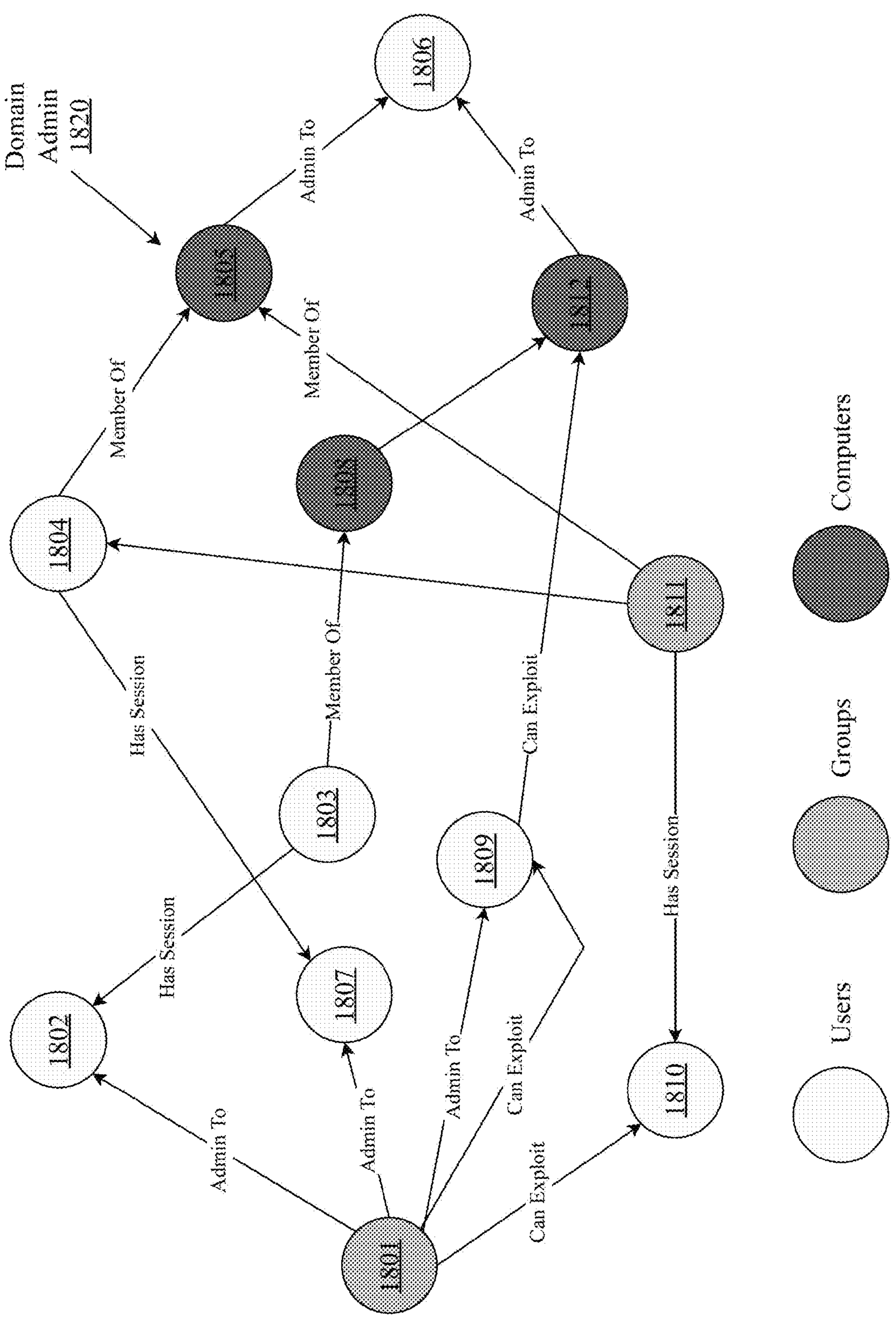
FIG. 18 is a block diagram illustrating one example of a possible network map which may be used for threat analysis.

FIG. 18 is a block diagram illustrating one example of a possible network map which may be used for threat analysis. The network map illustrated in FIG. 18 represents an example of a corporate network infrastructure, focusing on the relationships between users, groups, computers, and the potential exploitation paths that could be used by an attacker to gain unauthorized access to the domain admin account. The map includes "Users", "Groups", and "Computers" entities, which form the foundation of the network. Users represent individual employees or user accounts within the organization, while Groups are logical collections of users based on their roles, departments, or access permissions. Computers refer to the various devices, such as workstations, servers, and laptops that are connected to the network.

In the illustrated embodiment, users can be members of certain groups, indicating the access rights and permissions associated with each user based on their group memberships. This relationship is crucial in determining the level of access a user has to different resources within the network. Users and computers may be connected by has session relationships, representing active user sessions on specific computers. This information is essential for understanding which users are currently logged in to which devices and can help identify potential entry points for attackers. The map also showcases admin to relationships, which indicate administrative privileges or control over various entities. For example, certain Users or Groups may have administrative rights to manage other users, groups, or computers within the network. These administrative relationships are critical in assessing the potential impact of a compromised account, as an attacker with administrative privileges can easily escalate their access and control over the network.

The system can exploit relationship is an aspect of this network map which highlights the potential paths an attacker could take to compromise the domain admin 1820 account, which typically has the highest level of access and control over the entire network. By following the can exploit relationships, it's possible to trace the possible attack vectors, such as an attacker gaining initial access through a compromised user account, then leveraging that account's membership in a group with administrative privileges, and finally using those privileges to exploit a computer that has a direct path to the domain admin 1820 account. In this example, the network map reveals a hypothetical attack path: a user 1801 has a session on a computer 1803, and that computer can be exploited to gain access to another computer which has a direct administrative connection to the domain admin 1820 account. This visualization helps identify potential vulnerabilities and prioritize security measures to mitigate the risk of unauthorized access to critical assets. Risks may be directed to webapp vulnerabilities, for example, system may identify vulnerabilities that could allow unauthorized access or misuse of systems on the target network.

By combining information about users, groups, computers, and their relationships, network maps may provide a comprehensive view of the organization's network infrastructure from a security perspective. It enables security teams to assess the potential impact of compromised accounts, identify high-risk access paths, and develop targeted strategies to strengthen the overall security posture of the network.

Figure 19:
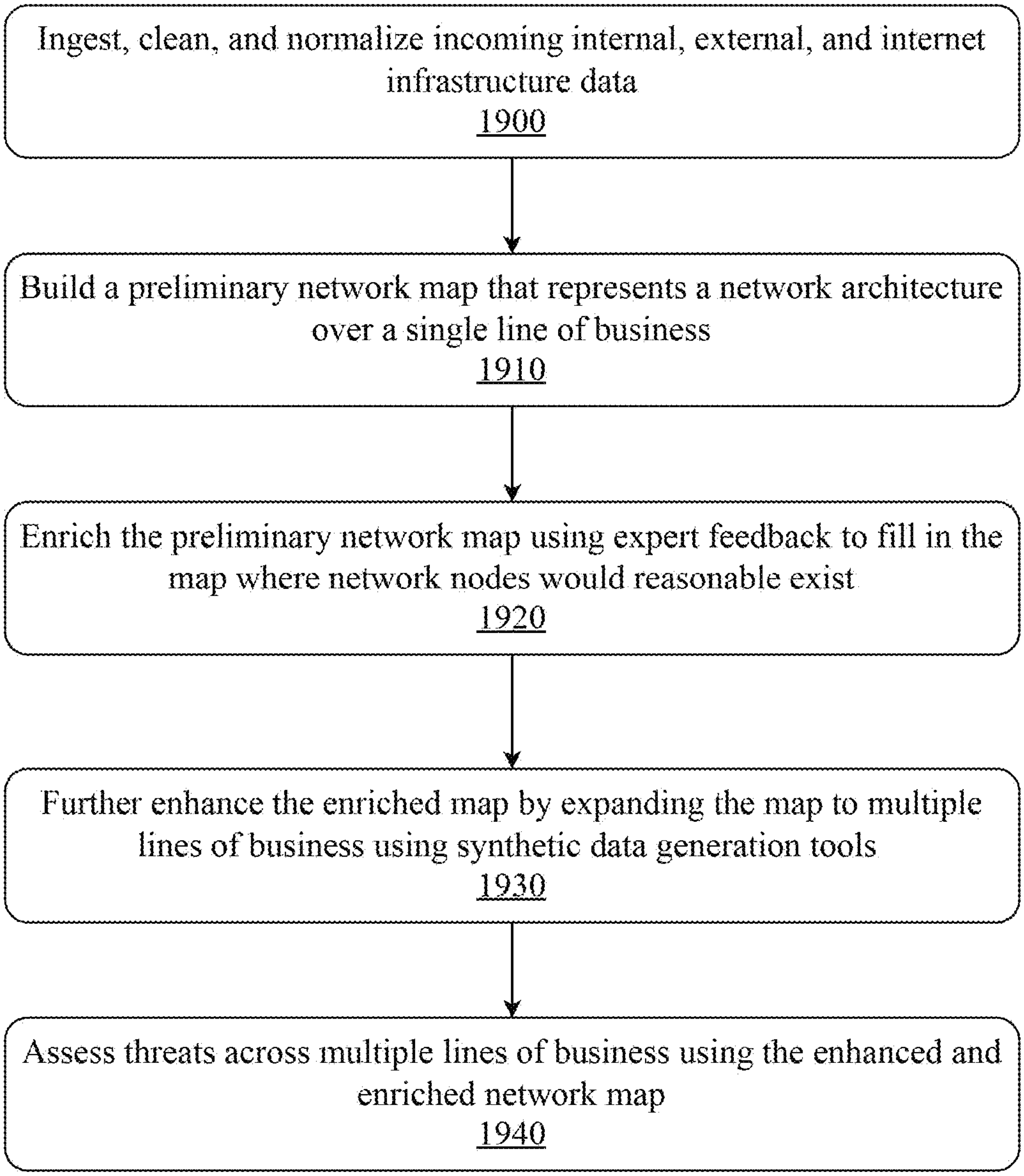
FIG. 19 is a flow diagram illustrating an exemplary method for generating multi-line network maps and conducting threat analysis using them.

FIG. 19 is a flow diagram illustrating an exemplary method for generating multi-line network maps and conducting threat analysis using them. In a first step, 1900, ingest, clean, and normalize incoming internal, external, and internet infrastructure data. Data may include but is not limited to internal infrastructure data, external infrastructure data, and internet infrastructure data. Internal data includes information about the organization's network components, such as routers, switches, servers, and their configurations. External data comprises information obtained from third-party sources, such as industry reports, vendor documentation, and regulatory filings. Internet infrastructure data includes publicly available information about network infrastructure, such as IP address ranges, domain names, and autonomous system numbers. Once the data is collected, it undergoes a process of cleaning and normalization. This process involves removing any duplicates, correcting errors, and standardizing the format of the data to ensure consistency and compatibility across different sources. The cleaned and normalized data is then ready for further analysis and processing.

In a step 1910, build a preliminary network map that represents a network architecture over a single line of business. Using the cleaned and normalized data, the next step is to create a preliminary network map focusing on a single line of business within the organization. This map provides a visual representation of the network architecture, including the various components and their interconnections. The map is built using automated tools that analyze the data and identify relationships between different network elements. The preliminary map serves as a foundation for further refinement and enhancement in the subsequent steps. It provides a basic understanding of the network structure and helps identify any gaps or inconsistencies in the data.

In a step 1920, enrich the preliminary network map using expert feedback to fill in the map where network nodes would reasonably exist. To improve the accuracy and completeness of the preliminary network map, the next step involves seeking expert feedback. Network administrators, security professionals, and other subject matter experts review the map and provide input based on their knowledge and experience. They help identify any missing network nodes or connections that should reasonably exist within the network architecture. The expert feedback is used to enrich the preliminary map, filling in the gaps and adding any necessary details. This step ensures that the map accurately represents the real-world network infrastructure and accounts for any undocumented or overlooked components.

In a step 1930, further enhance the enriched map by expanding the map to multiple lines of business using synthetic data generation tools. To create a comprehensive view of the organization's network infrastructure, the next step involves expanding the enriched map to encompass multiple lines of business. This is achieved using synthetic data generation tools, which create realistic but fictitious data points to represent network components and connections across different business units. The synthetic data is generated based on patterns and characteristics observed in the real data, ensuring that it closely mimics the actual network infrastructure. By incorporating synthetic data, the map can be extended to cover areas where real data may be lacking or unavailable. The expanded map provides a holistic view of the organization's network infrastructure, enabling a more comprehensive understanding of the relationships and dependencies between different lines of business.

In a step 1940, assess threats across multiple lines of business using the enhanced and enriched network map. This step involves leveraging the enhanced and enriched network map to assess threats across the entire organization. The map serves as a powerful tool for identifying potential vulnerabilities, attack vectors, and risk factors that could impact multiple lines of business. Security analysts and risk management professionals can use the map to perform scenario-based analyses, simulating different types of threats and assessing their potential impact on the network. They can identify critical assets, single points of failure, and interdependencies that could be exploited by attackers. By visualizing the network infrastructure across multiple lines of business, the map enables a more proactive and holistic approach to threat assessment. It helps prioritize security investments, develop targeted mitigation strategies, and improve overall network resilience.

Exemplary Computing Environment

Figure 20:
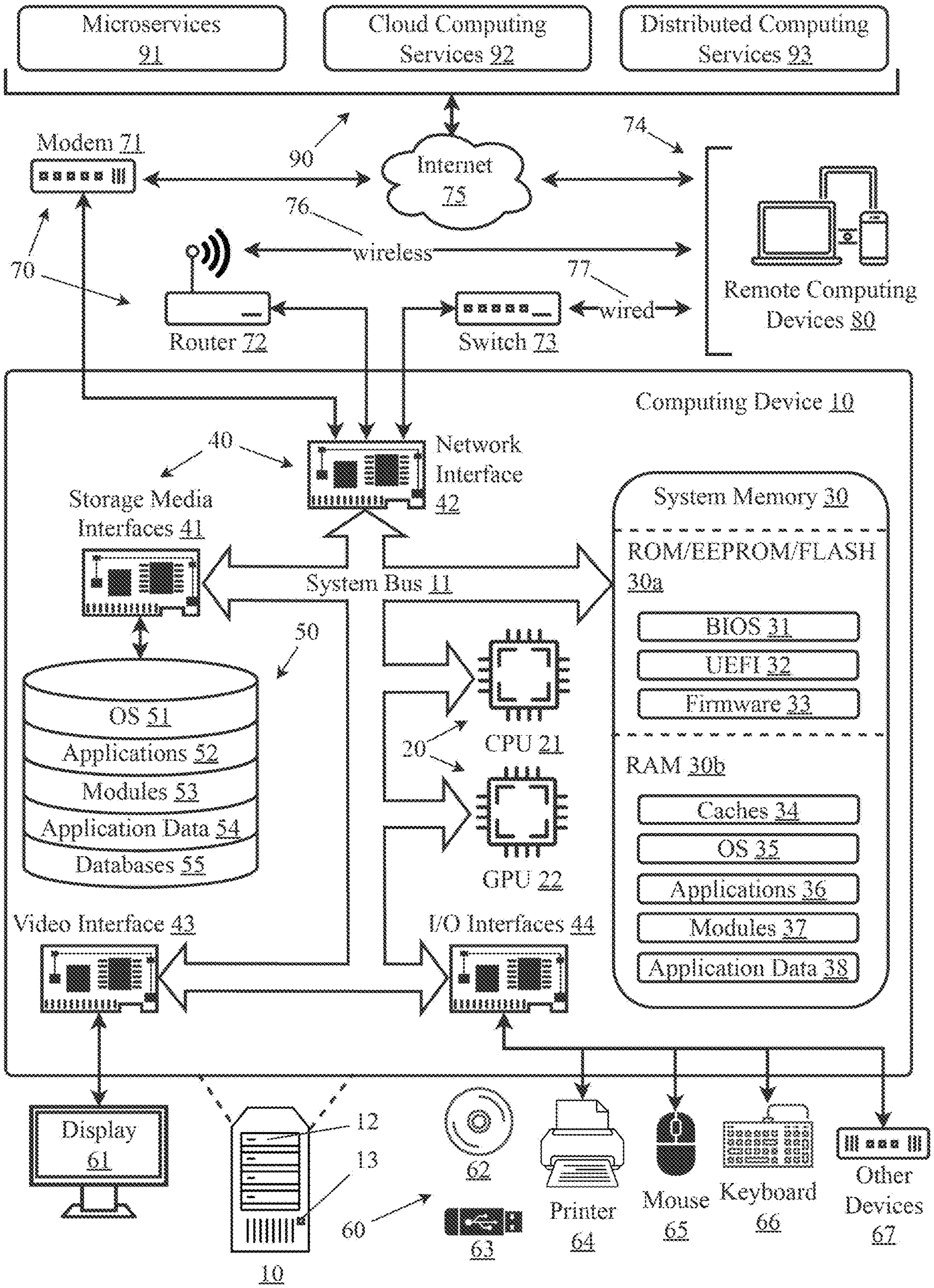
FIG. 20 is a block diagram illustrating an exemplary computing environment.

FIG. 20 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for cybersecurity analysis with network mapping, comprising:

one or more hardware processors configured for:

generating a graph representing a network architecture for a target network;

receiving a plurality of calculated scores related to cybersecurity of a plurality of entities of the target network, comprising a combination of scores based on analyses of social network data, network and domain configurations, previous leaks or attack vectors, or hardware analyses, from at least one input source;

assigning a weight to each of the calculated scores;

combining the weighted scores into a weighted cybersecurity score;

based on the graph representing the network architecture, recommending specific configuration changes to one or more entities of the target network to modify network security to bring the weighted cybersecurity score above a threshold, wherein the recommended specific configuration changes are generated using one or more pre-defined transformation pipelines.

2. The computing system of claim 1, further configured for:

defining the target network by identifying internet protocol addresses and subdomains of the target network, verifying domain name system information for each internet protocol address and subdomain of the target network, and assigning an Internet reconnaissance score;

collecting domain name system leak information by identifying improper network configurations in the internet protocol addresses and subdomains of the target network, and assigning a domain name system leak information score;

analyzing web applications used by the target network to identify vulnerabilities in the web applications that could allow unauthorized access to the target network, and assigning a web application security score;

searching social media networks for information of concern related to personnel identified within the target network, and assigning a social network score;

conducting a scan of the target network for open TCP/UDP ports, and assigning an open port score;

identifying leaked credentials associated with the target network that are found to be disclosed in previous breach incidents, and assigning a credential score;

gathering version and update information for hardware and software systems within the boundary of the target network, checking version and update information for the hardware and software systems within the boundary of the target network, and assigning a patching frequency score;

identifying content of interest contained within the target network, performing an Internet search to identify references to the content of interest, and assigning an open-source intelligence score; and weighting each of the Internet reconnaissance score, the domain name system leak information score, the web application security score, the social network score, the open port score, the credential score, the patching frequency score, and the open-source intelligence score and combining the weighted scores into the weighted cybersecurity score.

3. The computing system of claim 2, wherein the graph comprises a subgraph of a cyber physical graph.

4. The computing system of claim 2, further configured for assigning a service vulnerability score.

5. The computing system of claim 1, further configured for use of a chatbot for user interaction in a security operations center.

6. The computing system of claim 1, wherein the social network data, network and domain configurations, previous leaks or attack vectors, or hardware analyses from at least one input source are utilized in developing tickets that are assigned to analysts or groups of analysts based on shift times, skill sets, open issues, relationships between issues, or previously remediated tickets and work by the analysts or the groups of analysts.

7. The computing system of claim 1, wherein the recommended specific configuration changes are further based on factors including business impact, and cost of bringing a score into equilibrium with a score set point.

8. A method for cybersecurity analysis with network mapping, comprising the steps of:

using a computing device including a hardware processor:

generating a graph representing a network architecture for a target network;

receiving a plurality of calculated scores related to cybersecurity of a plurality of entities of the target network, comprising a combination of scores based on analyses of social network data, network and domain configurations, previous leaks or attack vectors, or hardware analyses, from at least one input source;

assigning a weight to each of the calculated scores;

combining the weighted scores into a weighted cybersecurity score;

based on the graph representing the network architecture, recommending specific configuration changes to one or more entities of the target network to modify network security to bring the weighted cybersecurity score above a threshold, wherein the recommended specific configuration changes are generated using one or more pre-defined transformation pipelines.

9. The method of claim 8, further comprising the steps of:

defining the target network by identifying internet protocol addresses and subdomains of the target network, verifying domain name system information for each internet protocol address and subdomain of the target network, and assigning an Internet reconnaissance score;

collecting domain name system leak information by identifying improper network configurations in the internet protocol addresses and subdomains of the target network, and assigning a domain name system leak information score;

analyzing web applications used by the target network to identify vulnerabilities in the web applications that could allow unauthorized access to the target network, and assigning a web application security score;

searching social media networks for information of concern related to personnel identified within the target network, and assigning a social network score;

conducting a scan of the target network for open TCP/UDP ports, and assigning an open port score;

identifying leaked credentials associated with the target network that are found to be disclosed in previous breach incidents, and assigning a credential score;

gathering version and update information for hardware and software systems within the boundary of the target network, checking version and update information for the hardware and software systems within the boundary of the target network, and assigning a patching frequency score;

identifying content of interest contained within the target network, performing an Internet search to identify references to the content of interest, and assigning an open-source intelligence score; and weighting each of the Internet reconnaissance score, the domain name system leak information score, the web application security score, the social network score, the open port score, the credential score, the patching frequency score, and the open-source intelligence score and combining the weighted scores into the weighted cybersecurity score.

10. The method of claim 9, wherein the graph comprises a subgraph of a cyber physical graph.

11. The method of claim 9, further comprising assigning a service vulnerability score.

12. The method of claim 8, further comprising the step of using a chatbot for user interaction in a security operations center.

13. The method of claim 8, wherein the social network data, network and domain configurations, previous leaks or attack vectors, or hardware analyses from at least one input source are utilized in developing tickets that are assigned to analysts or groups of analysts based on shift times, skill sets, open issues, relationships between issues, or previously remediated tickets and work by the analysts or the groups of analysts.

14. The method of claim 8, wherein the recommended specific configuration changes are further based on factors including business impact and cost of bringing a score into equilibrium with a score set point.

15. Non-transitory, computer-readable storage media having computer-executable instructions embodied thereon that, when executed by one or more processors of a computing system for cybersecurity analysis with network mapping, cause the computing system to:

generate a graph representing a network architecture for a target network;

receive a plurality of calculated scores related to cybersecurity of a plurality of entities of the target network, comprising a combination of scores based on analyses of social network data, network and domain configurations, previous leaks or attack vectors, or hardware analyses, from at least one input source;

assign a weight to each of the calculated scores;

combine the weighted scores into a weighted cybersecurity score;

based on the graph representing the network architecture, recommend specific configuration changes to one or more entities of the target network to modify network security to bring the weighted cybersecurity score above a threshold, wherein the recommended specific configuration changes are generated using one or more pre-defined transformation pipelines.

16. The media of claim 15, wherein the computing system is further caused to:

define the target network by identifying internet protocol addresses and subdomains of the target network, verify domain name system information for each internet protocol address and subdomain of the target network, and assign an Internet reconnaissance score;

collect domain name system leak information by identifying improper network configurations in the internet protocol addresses and subdomains of the target network, and assign a domain name system leak information score;

analyze web applications used by the target network to identify vulnerabilities in the web applications that could allow unauthorized access to the target network, and assign a web application security score;

search social media networks for information of concern related to personnel identified within the target network, and assign a social network score;

conduct a scan of the target network for open TCP/UDP ports, and assign an open port score;

identify leaked credentials associated with the target network that are found to be disclosed in previous breach incidents, and assign a credential score;

gather version and update information for hardware and software systems within the boundary of the target network, checking version and update information for the hardware and software systems within the boundary of the target network, and assign a patching frequency score;

identify content of interest contained within the target network, performing an Internet search to identify references to the content of interest, and assign an open-source intelligence score; and weight each of the Internet reconnaissance score, the domain name system leak information score, the web application security score, the social network score, the open port score, the credential score, the patching frequency score, and the open-source intelligence score and combine the weighted scores into the weighted cybersecurity score.

17. The media of claim 16, wherein the graph comprises a subgraph of a cyber physical graph.

18. The media of claim 16, wherein the computing system is further caused to assign a service vulnerability score.

19. The media of claim 15, wherein a chatbot is used for user interaction in a security operations center.

20. The media of claim 15, wherein the social network data, network and domain configurations, previous leaks or attack vectors, or hardware analyses from at least one input source are utilized in developing tickets that are assigned to analysts or groups of analysts based on shift times, skill sets, open issues, relationships between issues, or previously remediated tickets and work by the analysts or the groups of analysts.

21. The media of claim 15, wherein the recommended specific configuration changes are further based on factors including business impact and cost of bringing a score into equilibrium with a score set point.

22. A system for cybersecurity analysis with network mapping, comprising one or more computers with executable instructions that, when executed, cause the system to:

generate a graph representing a network architecture for a target network;

receive a plurality of calculated scores related to cybersecurity of a plurality of entities of the target network, comprising a combination of scores based on analyses of social network data, network and domain configurations, previous leaks or attack vectors, or hardware analyses, from at least one input source;

assign a weight to each of the calculated scores;

combine the weighted scores into a weighted cybersecurity score;

based on the graph representing the network architecture, recommend specific configuration changes to one or more entities of the target network to modify network security to bring the weighted cybersecurity score above a threshold, wherein the recommended specific configuration changes are generated using one or more pre-defined transformation pipelines.

23. The system of claim 22, wherein the system is further caused to:

define the target network by identifying internet protocol addresses and subdomains of the target network, verify domain name system information for each internet protocol address and subdomain of the target network, and assign an Internet reconnaissance score;

collect domain name system leak information by identifying improper network configurations in the internet protocol addresses and subdomains of the target network, and assign a domain name system leak information score;

analyze web applications used by the target network to identify vulnerabilities in the web applications that could allow unauthorized access to the target network, and assign a web application security score;

search social media networks for information of concern related to personnel identified within the target network, and assign a social network score;

conduct a scan of the target network for open TCP/UDP ports, and assign an open port score;

identify leaked credentials associated with the target network that are found to be disclosed in previous breach incidents, and assign a credential score;

gather version and update information for hardware and software systems within the boundary of the target network, checking version and update information for the hardware and software systems within the boundary of the target network, and assign a patching frequency score;

identify content of interest contained within the target network, performing an Internet search to identify references to the content of interest, and assign an open-source intelligence score; and weight each of the Internet reconnaissance score, the domain name system leak information score, the web application security score, the social network score, the open port score, the credential score, the patching frequency score, and the open-source intelligence score and combine the weighted scores into the weighted cybersecurity score.

24. The system of claim 23, wherein the graph comprises a subgraph of a cyber physical graph.

25. The system of claim 23, wherein the system is further caused to assign a service vulnerability score.

26. The system of claim 22, further comprising the step of using a chatbot for user interaction in a security operations center.

27. The system of claim 22, wherein the social network data, network and domain configurations, previous leaks or attack vectors, or hardware analyses from at least one input source are utilized in developing tickets that are assigned to analysts or groups of analysts based on shift times, skill sets, open issues, relationships between issues, or previously remediated tickets and work by the analysts or the groups of analysts.

28. The system of claim 22, wherein the recommended specific configuration changes are further based on factors including business impact and cost of bringing a score into equilibrium with a score set point.

* * * * *